United States Patent [19]

Satou et al.

[11] Patent Number: 5,367,512
[45] Date of Patent: Nov. 22, 1994

[54] MULTI-BEAM OPTICAL RECORDING-REPRODUCTION DEVICE WITH INDEPENDENT ERROR DETECTION FOR EACH BEAM

[75] Inventors: Yasuyuki Satou; Morihiro Karaki; Masahisa Shinoda, all of Nagaokakyo, Japan

[73] Assignee: Mitsubishi Denki Kabushiki Kaisha, Tokyo, Japan

[21] Appl. No.: 73,629

[22] Filed: Jun. 8, 1993

Related U.S. Application Data

[63] Continuation of Ser. No. 679,098, Apr. 2, 1991, abandoned.

[51] Int. Cl.$^5$ .............................................. G11B 7/095
[52] U.S. Cl. ............................... 369/44.23; 369/44.29; 369/44.31; 369/44.38
[58] Field of Search ........................ 369/44.23–44.25, 369/44.29, 44.31, 44.35, 44.37, 44.38

[56] References Cited

U.S. PATENT DOCUMENTS

| | | |
|---|---|---|
| 4,667,316 | 5/1987 | Suda et al. . |
| 4,695,992 | 9/1987 | Aoi .............................. 369/44.42 X |
| 4,775,968 | 10/1988 | Ohsato ............................ 369/44.37 |
| 4,787,076 | 11/1988 | Deguchi et al. ............. 369/44.37 X |
| 5,113,378 | 5/1992 | Kimura ............................ 369/44.37 |
| 5,130,965 | 7/1992 | Karaki et al. .............. 369/44.37 X |
| 5,140,577 | 8/1992 | Ohsato ............................ 369/44.37 |

OTHER PUBLICATIONS

G. Bouwhuis et al., "Principles of Optical Disc Systems", 1985, pp. 261–265.

*Primary Examiner*—W. R. Young
*Attorney, Agent, or Firm*—Leydig, Voit & Mayer

[57] ABSTRACT

A multi-beam optical recording-reproducing device is capable of detecting the focusing and tracking errors of respective beams independently of each other by means of a simple optical system. The optical system for independent tracking error detection may include a wedge prism 39 and a four-partitioned photosensor 42, and that for the independent focusing error detection may include a half prism 33 for dividing the beams into reflected and transmitted portions, first and second knife-edges 34 and 19 for the reflected and transmitted beams, respectively, and a first and second two-partitioned photosensors 35 and 20 for receiving the beams via the first and the second knife-edge, respectively (FIG. 7). Alternatively, the optical system for independent focusing error detection may include a single knife-edge plate 61 having two knife-edges, and a four-partitioned photosensor 64 (FIG. 10), or a wedge prism 71 and an eight-partitioned photosensor 74 (FIG. 12). Further, the optical system for independent tracking error detection may include a concave cylindrical lens 83 (FIG. 14) forming a far field pattern perpendicular to the tracks on the information storage optical medium 9.

17 Claims, 15 Drawing Sheets

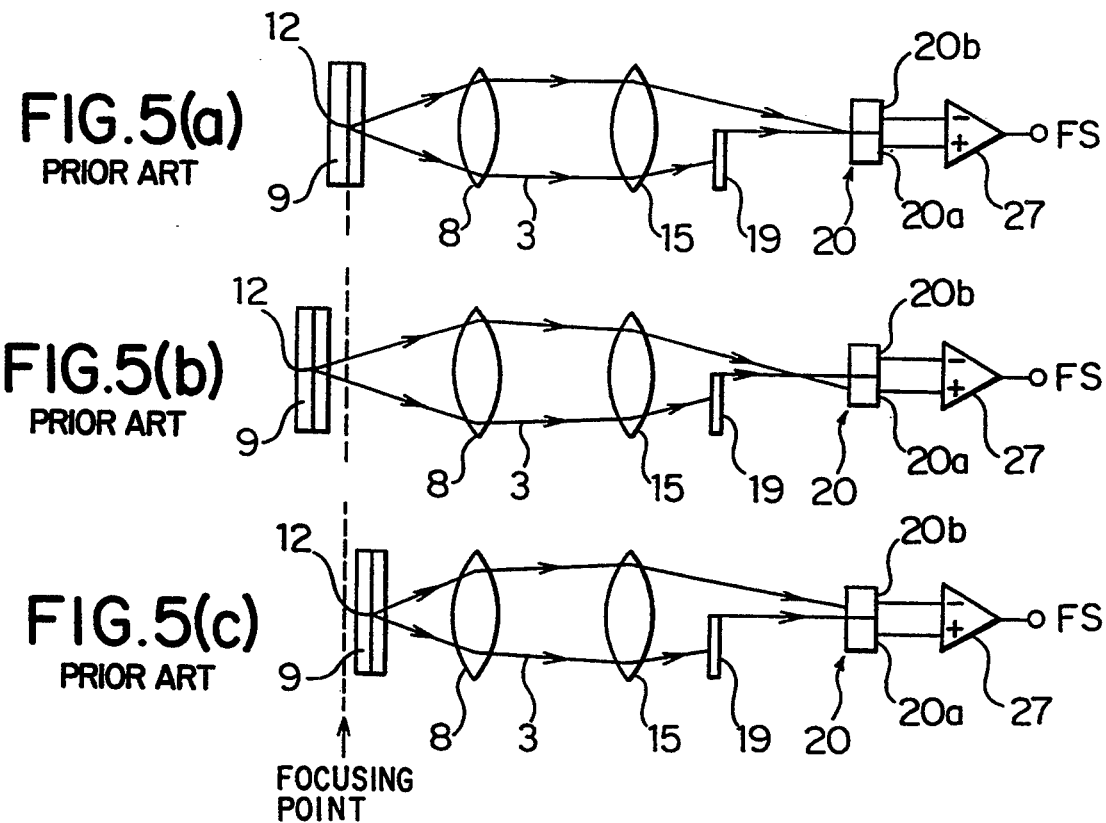

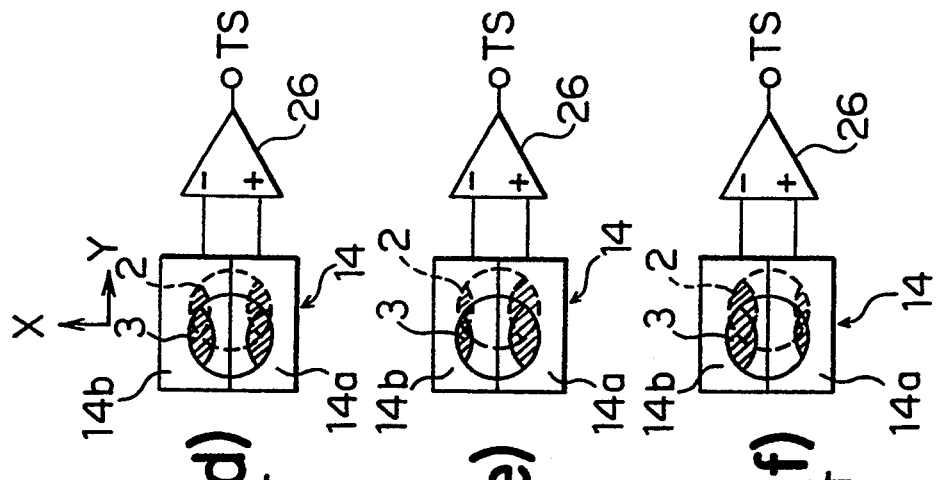
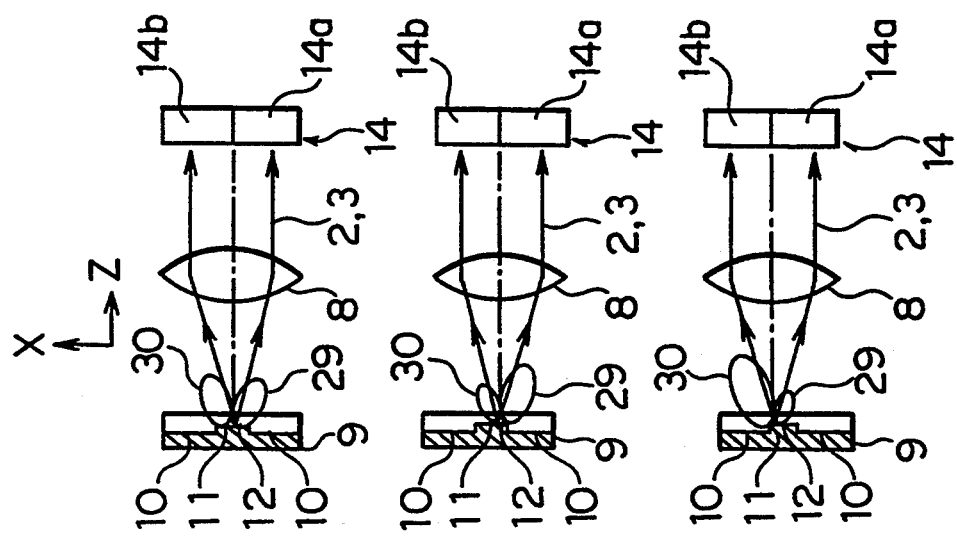

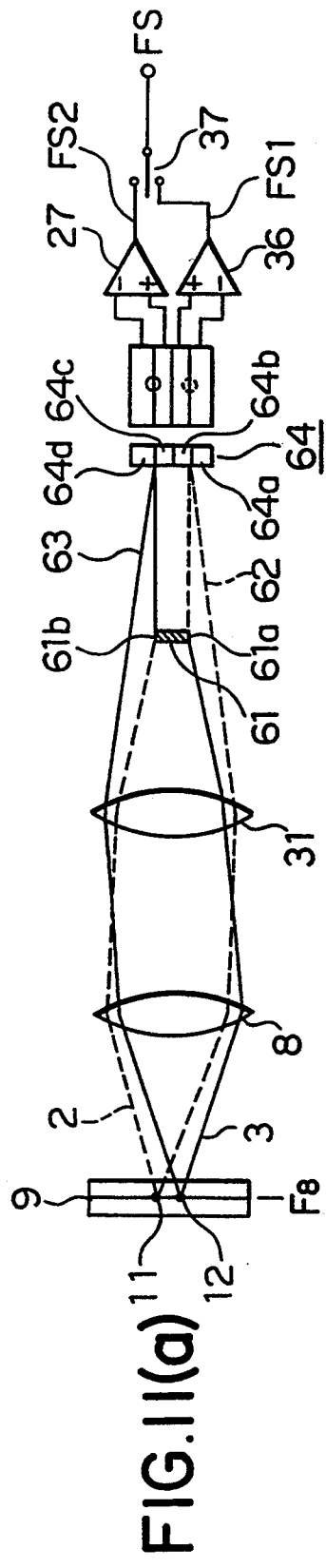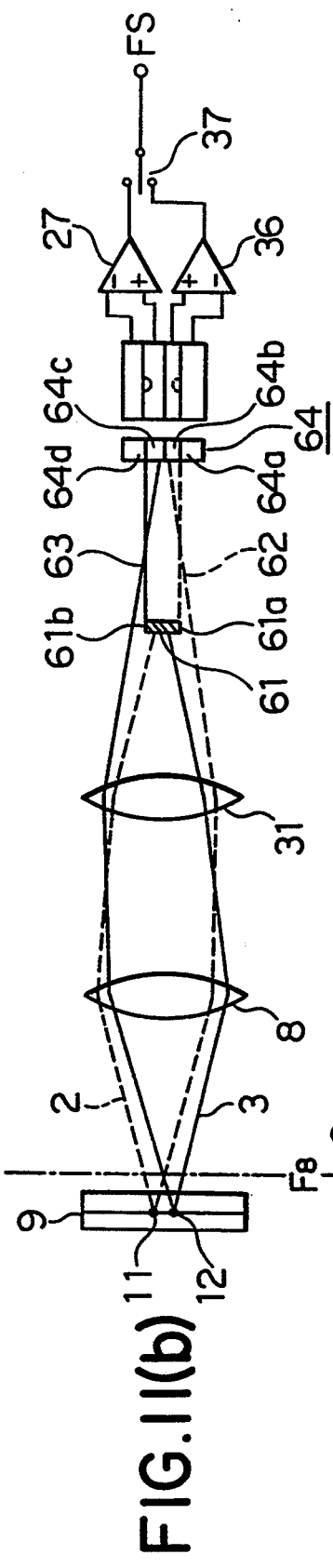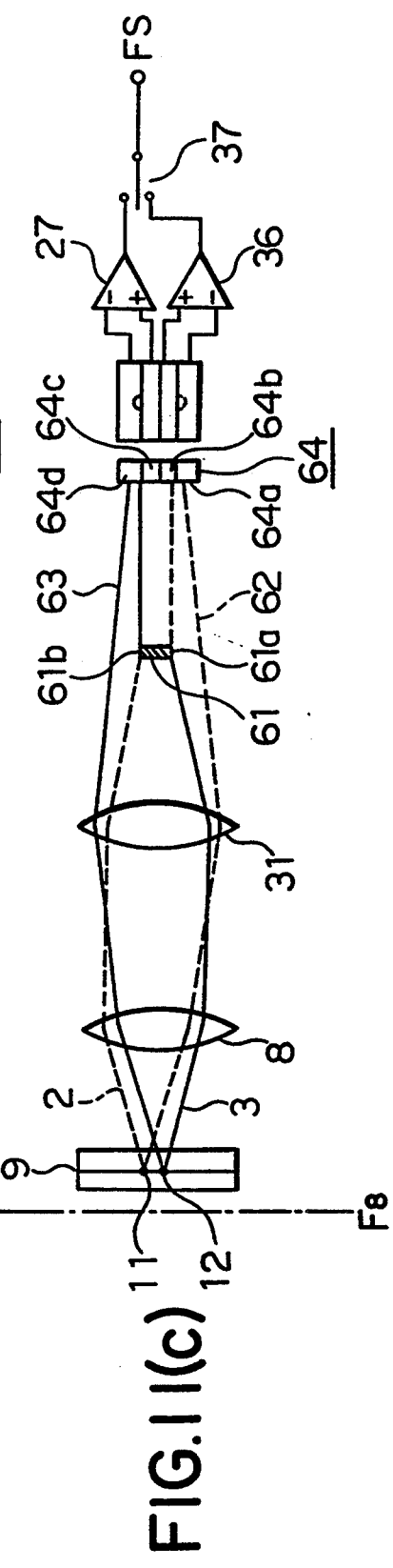

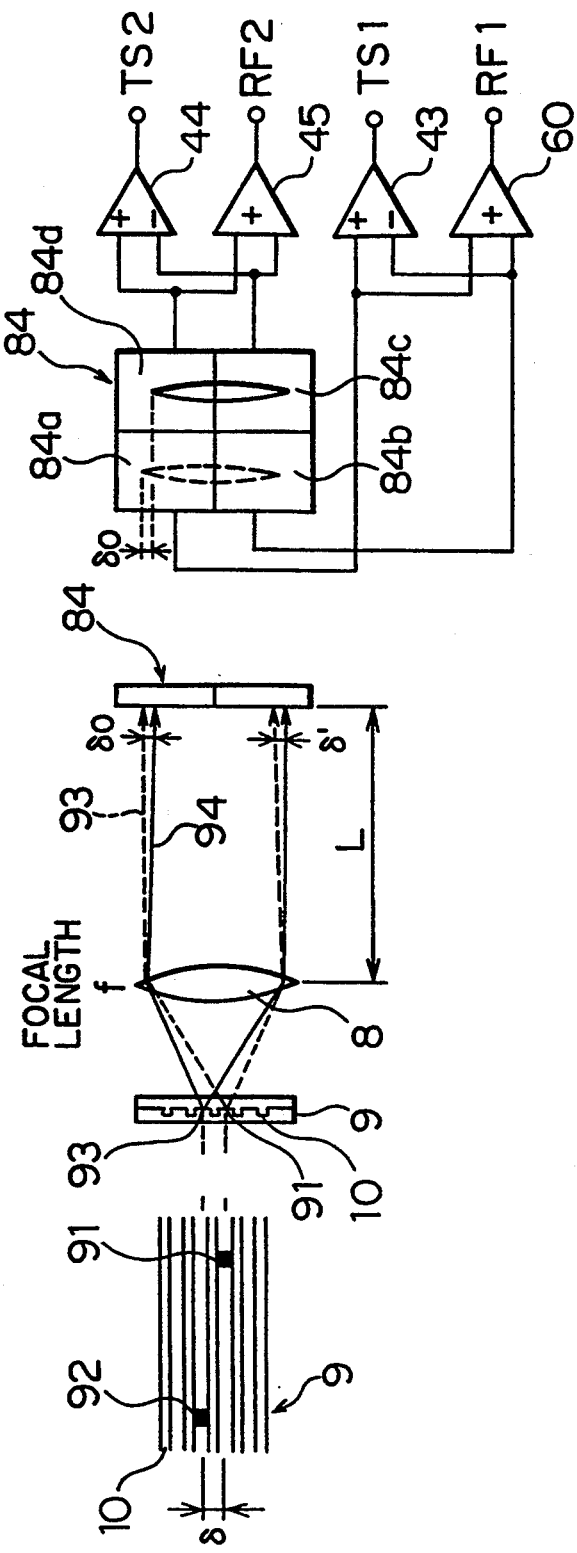

MULTI-BEAM OPTICAL RECORDING-REPRODUCTION DEVICE WITH INDEPENDENT ERROR DETECTION FOR EACH BEAM

This application is a continuation of application Ser. No. 07/679,098, filed Apr. 2, 1991, now abandoned.

BACKGROUND OF THE INVENTION

This invention relates to optical recording-reproducing devices, and more particularly to multi-beam optical recording-reproducing devices by which a plurality of light beams are radiated on an information storage medium to effect recording, reproduction, and erasure of information thereon.

In the case of conventional optical recording-reproducing devices, a single laser light beam is radiated on an information storage medium, such that recording, reproduction, or erasure of information is effected by means of this single beam. However, for the purpose of enhancing the recording and reproduction efficiency, optical recording-reproducing devices have been proposed by which a plurality of beams are radiated on the information storage medium. The functions served by the plurality of beams include (a) real time monitoring, (b) overwriting on recorded information, and (c) parallel recording and reproduction.

In the real time monitoring (a), at least two beams are radiated on the same track on an information storage medium. The information is recorded by the leading beam and the recorded information is reproduced by the trailing beam immediately after the recording, so as to check whether the information has been recorded correctly. The recording of information and its reproduction for error checking purposes can thus be effected simultaneously. It is noted that in the case of a conventional single-beam device, the recorded information is reproduced for the error checking purposes after a full turn of the medium, which results in loss of time.

In the overwriting of information (b), as in the case of real time monitoring (a), at least two beams are radiated on the same track on the information storage medium. The information recorded on a re-writable information storage medium is erased by the leading beam, while the trailing beam records the new information. Thus, the erasure and recording can be effected simultaneously. It is noted that in the case of conventional signal beam device, the new information is recorded after a full turn of the medium after the old information is erased.

In the parallel recording and reproduction (c), a plurality of beams are radiated on several distinct tracks on the information storage medium, such that recording, reproduction, and erasure can be effected simultaneously. A large amount of information can thus be processed simultaneously.

FIG. 1 shows the overall organization of a conventional optical recording-reproducing device utilizing two laser beams for the real time monitoring purpose, which is disclosed, for example, in the collection of papers: "Optical Memory Symposium '85," pp. 107 through 112. In FIG. 1, a two-beam semiconductor laser 1 emits a recording beam 2 and a reproducing beam 3 parallel to each other (see FIG. 2 for details of the two-beam semiconductor laser 1). Although an array type two-beam semiconductor laser 1 having two active regions is shown in the figures, a semiconductor laser device consisting of two ordinary laser elements each having one active region disposed parallel to each other may also be utilized, provided that the recording beam 2 and reproducing beam 3 can be driven independently of each other.

Further, a collimator lens 4 is disposed at the beam-emitting side of the two-beams semiconductor laser 1, and a polarization beam splitter 5 receives the recording beam 2 and the reproducing beam 3 transmitted through the collimator lens 4. A reflection mirror 6 directs upward (the direction being as represented in FIG. 1) the recording beam 2 and reproducing beam 3 transmitted through the polarization beam splitter 5. Further, a ¼-wavelength plate 7 and an objective lens 8 are disposed in the optical path between the reflection mirror 6 and the medium 9. The disk-shaped information storage medium 9 is disposed near the objective lens 8. Guide grooves 10 are formed along the information recording direction of the information storage medium 9, and a recording spot 11 and a reproduction spot 12 are formed on a track (formed between two adjacent grooves 10) via the recording beam 2 and reproducing beam 3, respectively, radiated on the information storage medium 9 along the guide grooves 10 (see FIG. 3 for detail).

To a side of the polarization beam splitter 5 is disposed a half mirror prism 13 which divides into reflected and transmitted portions the beams reflected by the polarization beam splitter 5. A two-partitioned photosensor 14 having two sensor surfaces 14a and 14b receives the beams transmitted through the half prism 13. A convex lens 15 converges the beams reflected by the half prism 13. A pin-hole mirror 16 for reflecting the recording beam 2 coming from the convex lens 15 has a pin hole 17 for selectively passing therethrough the reproducing beam 3. The reproducing beam 3 passing through the pin hole 17 is divided into reflected and transmitted beams by a half mirror prism 18. A knife-edge 19 is disposed on the optical path of the reproducing beam 3 transmitted through the half prism 18, and a two-partitioned photosensor 20 having a pair of sensor surfaces 20a and 20b receives the reproducing beam 3 via the knife-edge 19. On the other hand, a photosensor 21 receives the recording beam 2 reflected by the pin-hole mirror 16, thereby generating a monitoring signal E of the recording beam 2. Another photosensor 22 receives the reproducing beam 3 reflected by the half prism 18, thereby generating a reproduction output C. A reproduction signal detector circuit 23 generates in response to the reproduction output C a reproduction signal D (see FIG. 4).

On the other hand, a recording signal generation circuit 24 outputs a recording signal A in the form of a train of pulses (see FIG. 4). A driver circuit 25 drives the two-beams semiconductor laser 1 in response to the recording signal A.

A differential amplifier 26 for generating the tracking error signal TS has a pair of inputs for receiving the outputs of the sensor surfaces 14a and 14b of the photosensor 14. The two-partitioned photosensor 14 and the differential amplifier 26 constitute a well-known tracking error detection system known as the push-pull method system. A differential amplifier 27 for generating the focusing error signal FS has a pair of inputs for receiving the outputs of the sensor surfaces 20a and 20b of the photosensor 20. The knife-edge 19 and the two-partitioned photosensor 20 constitute a well-known focusing error detection system known as the knife-edge method system.

FIG. 3 shows the details of the recording spot 11 and the reproduction spot 12 formed on the information storage medium 9. The figure shows the case where the spots 11 and 12 are formed on a track formed between adjacent guide grooves 10. However, where preferred, the recording and reproduction may be effected on the guide grooves 10 themselves. In FIG. 3, the separation or distance between the recording spot 11 and the reproduction spot 12 is represented by reference character 1, while the rotational direction of the information storage medium 9 is indicated by an arrow. The pits 28 are formed (i.e., written) on the information storage medium 9 by the recording spot 11.

Next, the method of operation of the conventional optical recording-reproducing device of FIGS. 1 through 3 is described.

A recording signal A as shown in FIG. 4 is generated by the recording signal generation circuit 24, and the two-beam semiconductor laser 1 is driven by the driver 25 in accordance with the recording signal A. The recording beam 2 and the reproducing beam 3 emitted from the two-beam semiconductor laser 1 are collimated into parallel beams via the collimator lens 4, and after proceeding through the polarization beam splitter 5, reflection mirror 6, ¼-wavelength plate 7, and the objective lens 8 are radiated on the information storage medium 9 to form a recording spot 11 and a reproduction spot 12 thereon.

The recording spot 11 contains the recording information (such as the pulse widths) of the recording signal A, and thus successively forms on the information storage medium 9 the pits 28 having forms B corresponding to the recording information (see FIG. 4). On the other hand, the reproduction spot 12, trailing behind the recording spot 11 at a distance 1 and driven at a predetermined weaker intensity of light, reproduces the information of the pits 28 after an interval of time t1 (about a few microseconds) corresponding to the distance 1.

Namely, the recording spot 11 successively forms pits 28 on the information storage medium 9 and is reflected therefrom. The reproduction spot 12 is reflected by the pits 28 written by the recording spot 11. The recording beam 2 and the reproducing beam 3 thus reflected by the information storage medium 9 are transmitted through the objective lens 8 and ¼-wavelength plate 7. The direction of polarization of the beams 2 and 3 is rotated by 90 degrees when they thus pass through the ¼-wavelength plate 7 forward and backward. Thus, the beams 2 and 3 reflected from the information storage medium 9 are reflected by the polarization beam splitter 5. Next, parts of the beams 2 and 3 are reflected by the half prism 13, while parts thereof are transmitted through the half prism 13 and are inputted to the tracking error detection optical system (described in detail hereinbelow) to be utilized for the correction of the tracking error of the beams radiated on the information storage medium 9.

On the other hand, the beams 2 and 3 reflected by the half prism 13 are converged by the convex lens 15. The recording beam 2 is thereafter reflected by the pin-hole mirror 16, while the reproducing beam 3 passes through the pin-hole 17 thereof and partially is reflected by the half prism 18. The part of the reproducing beam 3 transmitted through the half prism 18 is input to the focusing error detection optical system (described in detail hereinbelow) to be utilized therein for the correction of the focusing error of the beams radiated on the information storage medium 9.

The recording beam 2 reflected by the pin-hole mirror 16 is received by the photosensor 21 and is thereby detected in the form of a pulse-shaped waveform E corresponding to the recording signal A, to be utilized for the detection of obstacles which are present on the information storage medium 9 or in the optical paths of the system, etc.

On the other hand, the reproduction beam 3 reflected by the half prism 18 is received by the photosensor 22, and is thereby detected in the form of reproduction output C having a waveform corresponding to the forms B of pits. The waveform of the output C is further processed by the reproduction signal detection circuit 23 to be output therefrom as the reproduction signal D in the form of a pulse train. The thus obtained reproduction signal D is compared with the recording signal A, to judge whether recording of information has been effected correctly.

The above example shows the case where the reflectivity of the information storage medium 9 is decreased by the formation of the pits 28. The real time monitoring of the information recording state, however, can also be effected in a manner similar to the above where the reflectivity of the information storage medium 9 is increased by the pits 28 formed thereon. Further, it is noted that although the reproduction signal D is delayed with respect to the recording signal A, the delay time t1 is on the order of several microseconds and hence the detection of the recording defects can be said to be effected substantially in the real time mode.

In the case where the information recorded on the information storage medium 9 is reproduced and no recording of information is effected, only the reproducing beam 3 is radiated from the two-beam semiconductor laser 1 and is detected by the reproduction signal detection circuit 23.

Next, referring to FIG. 5, the operation of the conventional focusing error detection optical system of the knife-edge method, constituted by the knife-edge 19, two-partitioned photosensor 20, and the differential amplifier 27, is described. It is noted that FIG. 5 shows only those portions which are essential to the understanding of the principles of operation. FIG. 5(a) shows the case where the information storage medium 9 is at the focal point of the objective lens 8, wherein the reproduction beam 3, formed into a semi-circular sectional form by the knife-edge 19, is focused on the center of the two-partitioned photosensor 20 just between the two light-receiving surfaces 20a and 20b. Under this circumstance, the output signal FS (focusing error signal) of the differential amplifier 27 is equal to zero. FIG. 5(b) shows the case where the information storage medium 9 is situated farther away from the objective lens 8 than at the focal point thereof, wherein the reproducing beam 3, partially interrupted by the knife-edge 19, is almost totally received by the lower (as represented in FIG. 5) light-receiving surface 20a, such that the output FS of the differential amplifier 27 becomes positive. On the other hand, FIG. 5(c) shows the case where the information storage medium 9 is nearer to the objective 8 than at the focal point thereof, wherein the reproducing beam 3 is incident on the upper light-receiving surface 20b, such that the output signal FS of the differential amplifier 27 becomes negative. Thus, a focusing error signal FS corresponding to the direction and magnitude of the focusing error is obtained via the differential amplifier 27.

Next, the method of operation of the conventional tracking error detection optical system of the push-pull method, constituted by the two-partitioned photosensor 14 and the differential amplifier 26, is described by reference to FIG. 6. It is noted that FIG. 6 shows only those portions which are essential to the understanding of the principles of the tracking error detection. FIG. 6(a) shows the case where there is no tracking error; FIG. 6(b) shows the case where the information-recording track is displaced to the positive direction of the X-axis (the direction +X); and FIG. 6(c) show the case where the track is displaced in the negative direction of the X-axis (the direction −X). The distributions of the first order diffraction light formed by the upper and lower edges of the track are represented by the curves 29 and 30, respectively. FIG. 6(d), (e), and (f) show the forms of the incident light spots on the two light-receiving surfaces 14a and 14b of the two-partitioned photosensor 14, with respect to the cases FIG. 6(a), (b), and (c), respectively. The recording beam 2 and the reproducing beam 3 form respective incident light spots having outer circular shapes on the photosensor 14. The centers of these incident light spots are positioned on the partition line between the two light-receiving surfaces 14a and 14b, being displaced from each other along the direction of the partition line. The distributions of the first order diffraction light 29 and 30 are shaded in FIG. 6(d) through (f).

When there is no tracking error as shown in FIG. 6(a), the distributions of the first order diffraction lights 29 and 30 formed by the two edges of the track between the guide grooves 10 are equal to each other. Thus, as shown in (d), the output of the two light-receiving surfaces 14a and 14b of the photosensor 14 are equal to each other, such that the output TS (tracking error signal) of the differential amplifier 26 is equal to zero. When, on the other hand, the track between the guide grooves 10 is displaced in the direction +X, the diffraction light distribution 29 becomes greater than the distribution 30, such that the intensities of incident light spots on the photosensor 14 become unbalanced and a positive output signal TS is generated from the differential amplifier 26. When the track is displaced toward −X as shown in (c), the distribution of the diffraction light 30 become greater than the distribution 29, and the output signal TS of the differential amplifier 26 becomes negative. Thus, the tracking error signal TS corresponding to the direction and the magnitude of the tracking error is obtained via the differential amplifier 26.

The above conventional optical recording-reproducing device, however, has the following disadvantages. Since both the recording beam 2 and the reproducing beam 3 are received on the two-partitioned photosensor 14, it is impossible to detect the tracking errors of the recording beam 2 and the reproducing beam 3 independently. Thus, the precision and reliability of the tracking control are low. Further, since the focusing error is detected only for the reproducing beam 3, the focusing error of the recording beam 2 may become substantial. These disadvantages become particularly manifest when the alignment of the optical system become deteriorated with the passage of time. A further disadvantage is that the optical system is complicated.

SUMMARY OF THE INVENTION

Thus, an object of this invention is to provide a optical recording-reproducing device which is capable of detecting the tracking and focusing errors of recording and the reproducing beams independently of each other by means of a simple optical system, so that the precision of the tracking and focusing error control and hence the reliability of recording and reproduction of information are enhanced.

The above object is accomplished in accordance with the principle of this invention by a optical recording-reproducing device which comprises: beam generator means for generating independent first and second light beams; an optical system for converging said first and second light beams on a track on said information storage medium; tracking error detector means for detecting independently respective tracking errors of said first and second light beams on a track on said information storage medium, said tracking error detector means generating independent tracking error signals corresponding to the respective tracking errors of the first and the second beams; tracking error change-over switching means for selecting one of the tracking error signals generated by said tracking error detector means; and tracking error control means for controlling said optical system in response to the selected tracking error signal to minimize the selected tracking error. Preferably, the device further comprises: focusing error detector means for detecting independently respective focusing errors of said first and second light beams on a track on said information storage medium, said focusing error detector means generating independent focusing error signals corresponding to the respective focusing errors of the first and the second beams; focusing error change-over switching means for selecting one of the focusing error signals generated by said focusing error detector means; and focusing error control means for controlling said optical system in response to the selected focusing error signal to minimize the selected focusing error.

Where the tracking errors are detected in accordance with a push-pull method, the tracking error detector means may comprise: a wedge-shaped prism having a first and a second refraction surface meeting at a ridge optically aligned with said tracks on the information storage medium; and a four-partitioned photosensor having a first and a second pair of independent sensor surfaces, wherein two sensor surfaces of each one of said first and second pairs of sensor surfaces receive beams refracted by said first and second refraction surfaces, respectively.

Where focusing errors are detected in accordance with a knife-edge method, the focusing error detector means may comprise: converging means for converging said first and second light beams reflected or diffracted by said information storage medium; a half mirror prism for dividing into reflected and transmitted portions said first and second light beams converged by said converging means; a first knife-edge member for partially shielding the first beam reflected by said half mirror prism, said first knife-edge member totally shielding the second beam reflected by said half prism; a second knife-edge member for partially shielding second beam transmitted by said half mirror prism, said second knife-edge member totally shielding the first beam; a first two-partitioned photosensor having a pair of independent sensor surfaces receiving on a partition line therebetween said first beam converged by said converging means and partially shielded by said first knife-edge member; and a second two-partitioned photosensor having a pair of independent sensor surfaces receiving on a partition line therebetween said second beam converged by said converging means and partially shielded by said second knife-edge member. Alternatively, the focusing error detector means may comprise: converging means for converging said first and second light beams reflected or diffracted by said information storage medium; a knife-edge member having a pair of knife-edges for partially shielding said first and second beams, respectively, converged by said converging means; and a four-partitioned photosensor having a first and a second pair of independent sensor surfaces, said first pair of sensor surfaces receiving on a partition line therebetween said first beam converged by said converging means and partially shielded by said knife-edge member, and said second pair of sensor surfaces receiving on a partition line therebetween said second beam converged by said converging means and partially shielded by said knife-edge member.

Where the focusing errors are detected in accordance with a Foucault method, the focusing error detector means is preferred to comprise: converging means for converging said first and second light beams reflected or diffracted by said information storage medium; a wedge-shaped prism having a first and a second refraction surfaces meeting at a ridge optically perpendicular to said tracks on the information storage medium, wherein said first and second beams converged by said converging means are each divided into two portions refracted by the first and the second refraction surfaces of said wedge-shaped prism, respectively; and an eight-partitioned photosensor having an array of first through eight independent sensor surfaces divided by partition lines substantially parallel to said ridge of the wedge prism, wherein first and second sensor surfaces receiving on a partition line therebetween the first beam refracted by said first refraction surface, fifth and sixth sensor surfaces receiving on a partition line therebetween the first beam refracted by said second refraction surface, third and fourth sensor surfaces receiving on a partition line therebetween the second beam refracted by said first refraction surface, and seventh and eight sensor surfaces receiving on a partition line therebetween the second beam refracted by said second refraction surface of the wedge prism. It is preferred that the partition line between the first and second sensor surfaces and the partition line between the fifth and sixth sensor surfaces are inclined with respect to the direction of the ridge of the wedge-shaped prism.

Furthermore, where the tracking errors are detected in accordance with the push-pull method, the tracking error detector means may comprise: an optical system for guiding said first and second light beams reflected or diffracted by said information storage medium, wherein said optical system converges said first and second beams along a direction optically parallel to said tracks on the information storage medium, and forms far field patterns for said first and second beams in a direction optically perpendicular to the tracks on the information storage medium; and a four-partitioned photosensor having a first and second pair of independent sensor surfaces disposed at converging positions of said first and second beams converged by said optical system, wherein the first pair of sensor surfaces are arranged along the direction of the far field pattern of the first beam so as to receive the first beam centered on a partition therebetween and the second pair of sensor surfaces are arranged along the direction of the far field pattern of the second beam so as to receive the second beam centered on a partition line therebetween. Preferably, the optical system comprises a concave cylindrical lens having a direction of lens action optically perpendicular to the direction of the tracks on the information storage medium.

BRIEF DESCRIPTION OF THE DRAWINGS

The features which are believed to be characteristic of this invention are set forth in the appended claims. This invention itself, however, both as to its organization and method of operation, together with further objects and advantages thereof, may best be understood from the detailed description of the preferred embodiments, considered in connection with the accompanying drawings, in which:

FIGS. 5(a)–5(c) are a schematic view of the optical system of FIG. 1, showing the principle of focusing error detection according to the knife-edge method;

FIGS. 6(a)–6(f) are a schematic view of the optical system of FIG. 1, showing the principle of tracking error detection according to the push-pull method;

FIGS. 11(a)–11(c) are a schematic view of the optical system of FIG. 10, showing the principle of independent focusing error detection thereof;

FIGS. 15(a)–15(d) show the principle of independent tracking error detection in the device of FIG. 14.

In the drawings, like reference numerals represent like or corresponding parts.

DETAILED DESCRIPTION OF THE PREFERRED EMBODIMENTS

Referring next to the accompanying drawings, preferred embodiments according to this invention are described.

Figure 7:
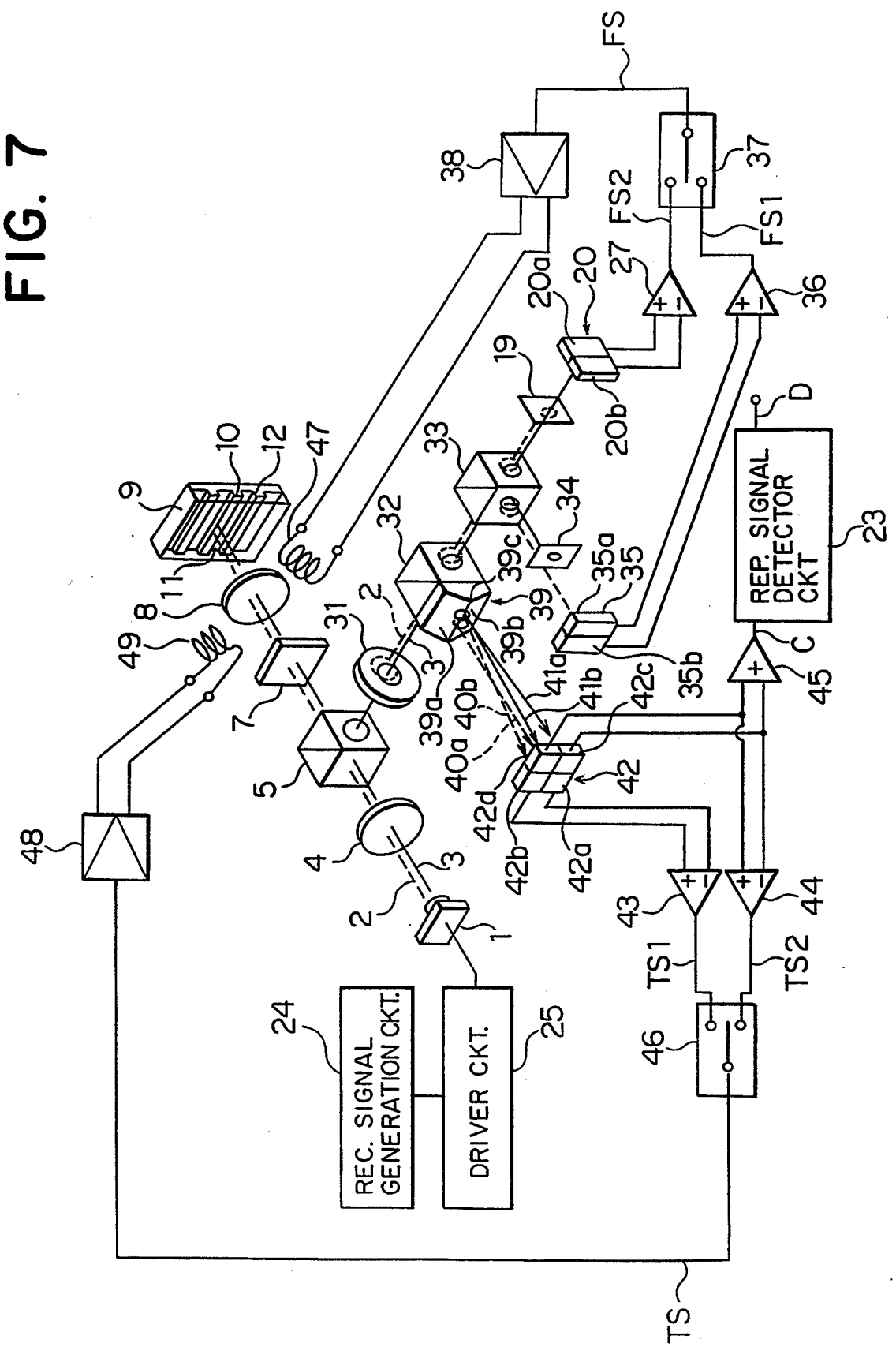
FIG. 7 is a view similar to that of FIG. 1, but showing a optical recording-reproducing device according to an embodiment of this invention.
Figure 8:
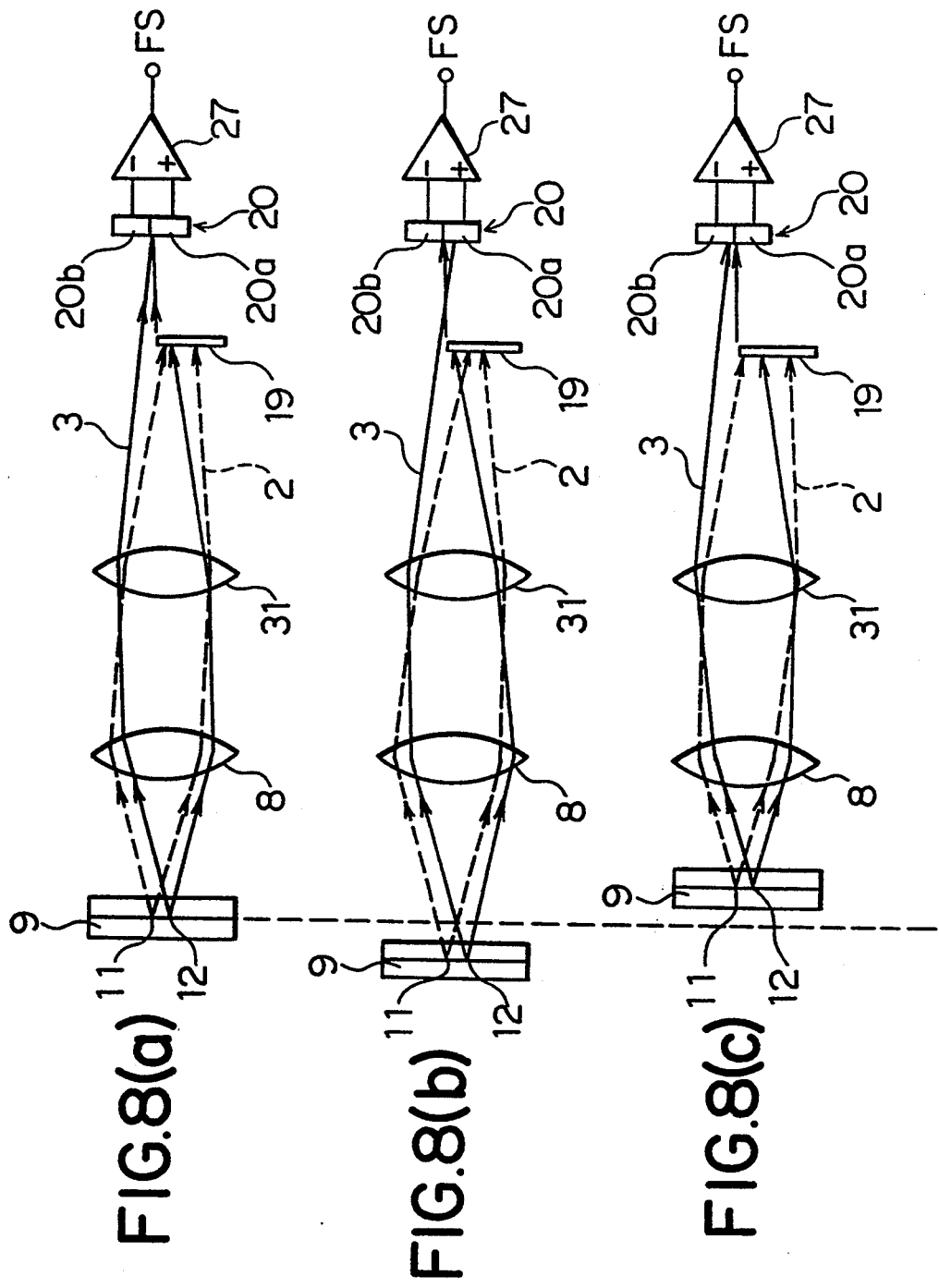
FIGS. 8(a)–8(c) are a schematic view of the optical system of FIG. 7, showing the principle of focusing error detection for the recording beam.
Figure 9:
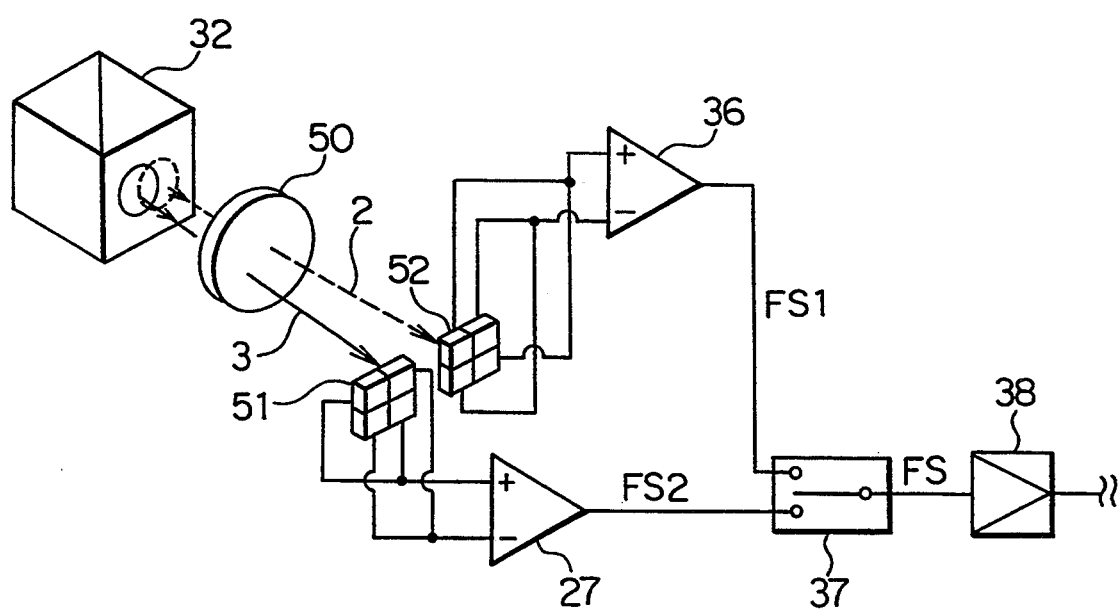
FIG. 9 is a view of a part of the optical system according to another embodiment for independent focusing error detection for the recording and reproduction beams.

FIGS. 7 through 9 show an optical recording-reproducing device according to a first embodiment of this invention. Parts 1 through 5, 7 through 12, 23 through 25, and 27 are similar to those of the conventional device described above. Thus, a recording signal generation circuit 24 generates a pulse-shaped recording signal, and the driver circuit 25 drives the two-beam semiconductor laser 1. In response thereto, the two-beam semiconductor laser 1 radiates a recording beam 2 and a reproducing beam 3, which are collimated by the collimator lens 4 and, after passing through the polarization beam splitter 5, ¼-wavelength plate 7, and objective lens 8, are radiated on the information storage medium 9 to form a recording spot 11 and a reproduction spot 12 on a track formed between adjacent guide grooves 10. Further, the beams 2 and 3 reflected by the information storage medium 9 are reflected, after passing through the objective lens 8 and the ¼-wavelength plate 7, by the polarization beam splitter 5.

The recording beam 2 and the reproducing beam 3 thus reflected by the polarization beam splitter 5 are converged by a convex lens 31. A half mirror prism 32 partially transmits and partially reflects the converged beams 2 and 3, thereby dividing the beams 2 and 3, respectively, into transmitted and reflected beam portions. A second half mirror prism 33 is disposed on the optical path of the beams transmitted through the half prism 32, so as to divide them further into transmitted and reflected portions. Disposed in the direction of the beams transmitted through the half prism 33 are a knife-edge 19 and a two-partitioned photosensor 20 having two sensor surfaces 20a and 20b. The difference between the outputs of the two sensor surfaces 20a and 20b of the photosensor 20 is detected by the differential amplifier 27, the output of which constitutes a focusing error signal FS2 for the reproducing beam 3.

Further, disposed in the direction of the beams reflected by the second half mirror prism 33 are a knife-edge 34 and a two-partitioned photosensor 35 having sensor surfaces 35a and 35b. The outputs of the two sensor surfaces 35a and 35b of the photosensor 35 are coupled to a differential amplifier 36, by means of which a focusing error signal FS1 for the recording beam 2 is generated. The knife-edge 34, the photosensor 35, and the differential amplifier 36 constitute an optical focusing error detection system known as the knife-edge method system.

A change-over switch 37 selects one of the outputs FS2 and FS1 of the differential amplifiers 27 and 36, such that a desired focusing error signal FS for the recording beam 2 or the reproducing beam 3 is obtained. A focusing error servo circuit 38 controls the focusing actuator 47 in response to the focusing error signal FS.

A wedge-shaped prism 39, disposed in the optical path of the beams reflected by the half prism 32, has two refraction surfaces 39a and 39b meeting at a central ridge line 39c. The ridge 39c of the half prism 39 is optically aligned with the line connecting the centers of intensity of the recording beam 2 and the reproducing beam 3. Although the wedge prism 39 and the half prism 32 are in contact with each other in this embodiment, they may be separated from each other.

After passing through the wedge prism 39, the recording beam 2 is divided into two beam portions 40a and 40b refracted by the refraction surfaces 39a and 39b, respectively. Similarly the reproducing beam 3 is divided into beams 41a and 41b, refracted by the refraction surfaces 39a and 39b, respectively.

A four-partitioned photosensor 42 has four sensor surfaces 42a, 42b, 42c, and 42d, which receive the four beams 40a, 40b, 41a, and 41b, respectively, coming from the wedge prism 39. The sensor surfaces of the photosensor 42 are disposed at the converging positions of respective beams. A differential amplifier 43 detects the difference between the outputs of the sensor surfaces 42a and 42b, thereby obtaining a tracking error signal TS1 for the recording beam 2. Another differential amplifier 44 detects the difference between the outputs of the sensor surfaces 42c and 42d, thereby obtaining a tracking error signal TS2 for the reproducing beam 3. Further, an adder 45 adds the outputs of the two sensor surfaces 42c and 42d to generate a reproduction output C. The reproduction signal detector circuit 23 forms a reproduction signal D from the reproduction output C output from the adder 45. Further, a change-over circuit 46 switches between (i.e., selects one of) the outputs TS1 and TS2 of two differential amplifiers 43 and 44, such that a tracking error signal TS for a desired beam (the recording beam 2 or reproducing beam 3) is selected. The tracking error signal TS is input to the tracking servo circuit 48 driving the tracking actuator 49.

The recording and reproduction of information on the information storage medium 9 are effected by means of the recording beam 2 and reproducing beam 3 emitted from the two-beam semiconductor laser 1. This is effected in a manner similar to the case of the conventional device described above. On the other hand, the detection of focusing and tracking errors according to this invention is effected as follows.

As shown in FIG. 7, the sensor surfaces of the four-partitioned photosensor 42 are positioned at the converging points of the recording beams 40a and 40b and the reproduction beams 41a and 41b. Thus, the converging points of the four beams are spatially separated from each other to form distinct four points, and the four beams are incident on the respective sensor surfaces 42a, 42b, 42c, and 42d of the photosensor 42 distinctly and independently from each other. Thus, the separation of the recording beam and the reproducing beam can be realized without utilizing a costly complicated optical system.

Next, the principle of the tracking error detection is described. Since the ridge 39c between the two refraction surfaces 39a and 39c of the wedge prism 39 is optically substantially aligned with the guide grooves 10 of the information storage medium 9, the parts of the first order diffraction light diffracted at one edge of the track between the guide grooves 10 are contained in the beams 40a and 41a, while the parts of the diffraction light diffracted at the other edge of the track are contained in the beams 40b and 41b. The beams 40a and 40b are received separately by sensor surface pairs 42a and 42b, while the beams 40b and 41b are received separately by sensor surface pairs 42c and 42d. Thus, the differential amplifier 43 having inputs coupled to the sensor surfaces 42a and 42b outputs the tracking error signal TS1 of the recording beam 2, while the differential amplifier 44 having inputs coupled to the sensor surfaces 42c and 42d outputs the tracking error signal TS2 of the reproducing beam 3, in accordance with the principle of the push-pull method. The change-over switch 46 switches between (selects one of) the outputs of the differential amplifiers 43 and 44, and selects the desired tracking error signal TS form the two tracking error signals TS1 and TS2. For example, when only recording of information is effected, the output TS1 of the differential amplifier 43 resulting from the recording beams 40a and 40b is selected as the tracking signal TS, thereby effecting the tracking of the recording beam 2. On the other hand, when only reproduction of information is effected, the output TS2 of the differential amplifier 44 resulting from the reproduction beams 41a and 41b is selected as the tracking error signal TS, thereby effecting the tracking of the reproducing beam 3. Thus, the tracking operation can be effected separately for the recording beam 2 and the reproducing beam 3. This capability of selection is particularly effective in the case where, due to the deterioration of alignment with the passage of time, the line connecting the light spots 11 and 12 of the recording beam 2 and the reproducing beam 3 comes to be out of alignment with the direction of the guide grooves 10 on the information storage medium 9. Thus, according to this invention, the recording and reproduction characteristics can be maintained at a high level, and the reliability of recording and reproduction is thus improved.

Figure 4:
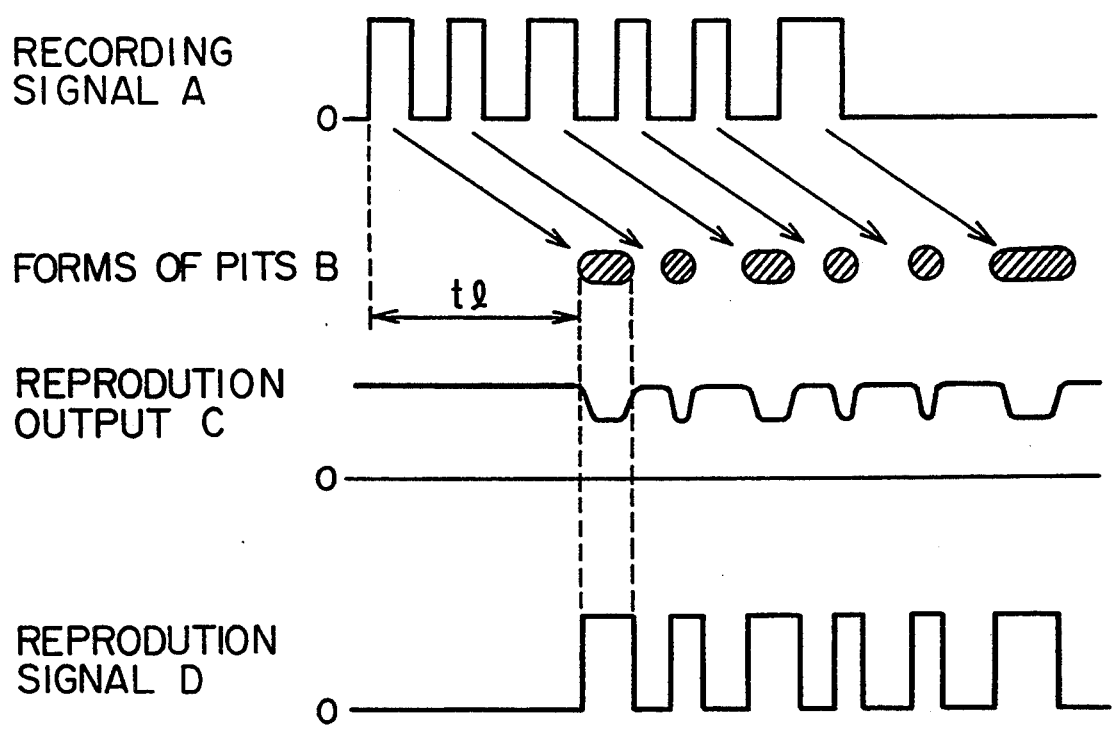
FIG. 4 shows waveforms, etc., of several signals generated with an optical recording-reproducing device.

On the other hand, the adder 45 adds the outputs of the sensor surfaces 42c and 42d receiving the reproduction beams 41a and 41b. Thus, the output of the adder 45 has a waveform C corresponding to the pit forms B, as shown in FIG. 4. The reproduction signal detector circuit 23 inverts and shapes the output C, thereby obtaining and outputting a reproduction signal D having a pulse-shaped waveform corresponding to the recording signal A. The reproduction signal D thus obtained by the reproduction signal detector circuit 23 is compared with the recording signal A generated by the recording signal generation circuit 24, in order to detect information recording errors or defects.

Next, the method of focusing error detection with respect to the reproducing beam 3 is described by reference to FIG. 8, wherein the top view (a) shows the case where the information storage medium 9 is at the focal point of the objective lens 8, the middle view (b) shows the case where the information storage medium 9 is farther away from the objective lens 8 than the focal point of the objective lens 8, and the bottom view (c) shows the case where the information storage medium 9 is nearer to the objective lens 8 than the focal point of the objective lens 8. The knife-edge 19 is disposed at such a position that it completely shields and screens the recording beam 2 while shielding just the lower half (as represented in FIG. 8) of the cross section of the reproducing beam 3 at the time when the information storage medium 9 is at the focal point of the objective lens 8 as shown at the top view (a). Thus, the reproducing beam 3, knife-edge 19, the photosensor 20 and the differential amplifier 27 constitute a focusing error detection system of the push-pull method for the reproducing beam 3 which is identical in organization and operation to that of the conventional device described above by reference to FIG. 5. Thus, the focusing error of the reproducing beam 3 is detected via the output FS2 of the differential amplifier 27.

The detection of the focusing error of the recording beam 2 is effected similarly by means of the knife-edge 34, photosensor 35, and the differential amplifier 36. The knife-edge 34 is disposed at such a position that it completely shields the reproducing beam 3, while shielding a right half (as viewed in FIG. 7) of the cross section of the recording beam 2. Thus, the knife-edge 34, the photosensor 35, and the differential amplifier 36 constitute a focusing error system for the recording beam 2, and the differential amplifier 36 outputs a focusing error signal FS1 of the recording beam 2.

The change-over switch 37 can select one of the outputs FS2 and FS1 of the differential amplifiers 27 and 36, and thus is capable of switching between the focusing error signals of the recording beam 2 and the reproducing beam 3. This capability of selection is particularly effective in the case where there is a large chromatic aberration in the optical system, etc.

In response to the tracking error signal TS obtained as described above, the tracking actuator driver servo circuit 48 drives the tracking actuator 49 such that the tracking error is corrected with respect to the selected beam. On the other hand, in response to the focusing error signal FS as obtained as described above, the focusing error actuator driver servo circuit 38 drives the focusing actuator 47 such that focusing error is corrected with respect to the selected beam.

The focusing error of the recording beam 2 and the reproducing beam 3 may be detected by a system other than that according to the push-pull method. FIG. 9 shows an example of such an alternative focusing error detection system comprising parts 50 through 52 which may be used instead of the half prism 33, the knife-edges 19 and 34, and the photosensors 20 and 35. In FIG. 9, the parts similar or corresponding to those of FIG. 7 are represented by the same reference numerals. A cylindrical lens 50 having an astigmatism is disposed in the optical path of the beams 2 and 3 transmitted through the half prism 32. Further, a pair of four-partitioned photosensors 51 and 52 are disposed to receive the beams 2 and 3 transmitted through the cylindrical lens 50. The photosensor 51 receives the reproducing beam 3, while the photosensor 52 receives the recording beam 2. The principle of focusing error detection of the system of FIG. 9 is well known as the astigmatic method and is widely utilized in optical pick-ups for compact disks, etc. Hence further description of the method is deemed unnecessary. It is to be noted, however, that independent focusing error signals FS1 and FS2 can be obtained via the differential amplifiers 36 and 27.

Figure 10:
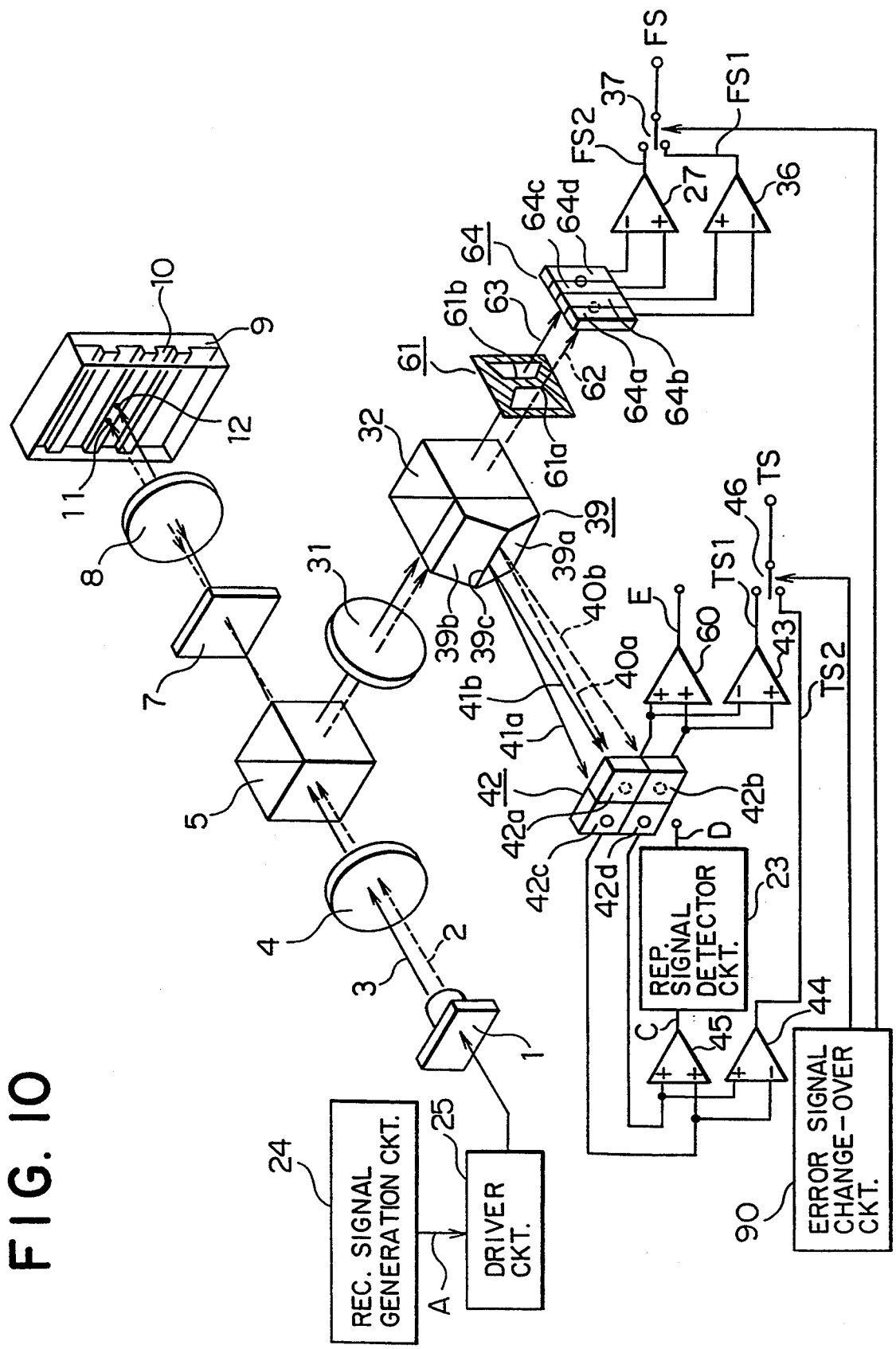
FIG. 10 is a view similar to that of FIG. 1, but showing still another embodiment according to this invention.

Referring next to FIGS. 10 and 11, another embodiment according to this invention is described.

The parts 1 through 5, 7 through 12, 23 through 25, and 27 are similar to those of the conventional device described above. A recording signal generation circuit 24 generates a pulse-shaped recording signal, and the driver circuit 25 drives the two-beam semiconductor laser 1. The figure shows a two-beam semiconductor laser 1 of the array type having two active regions. However, a laser device consisting of two laser elements each having an active region may be utilized instead thereof, provided that the recording beam 2 and the reproducing beam 3 can be driven independently. The recording beam 2 and reproducing beam 3 radiated from the two-beams semiconductor laser 1 are collimated by the collimator lens 4 and, after passing via the polarization beam splitter 5, ¼-wavelength plate 7, and objective lens 8, are radiated on the information storage medium 9 to form a recording spot 11 and a reproduction spot 12 on a track formed between adjacent guide grooves 10. The beams 2 and 3 reflected by the information storage medium 9 are, after passing again through the objective lens 8 and the ¼-wavelength plate 7, reflected by the polarization beam splitter 5.

The recording beam 2 and the reproducing beam 3 thus reflected by the polarization beam splitter 5 are converged by a convex lens 31. A half mirror prism 32 partially transmits and partially reflects the converged beams 2 and 3, thereby dividing the beams 2 and 3, respectively, into transmitted and reflected beam portions.

A wedge-shaped prism 39, disposed in the optical path of the beams reflected by the half prism 32, has two refraction surfaces 39a and 39b meeting at a central ridge line 39c. The ridge 39c of the wedge prism 39 is optically parallel to the converging beams 2 and 3 passing through the convex lens 31, i.e., perpendicular to the beams reflected by the half mirror prism 32, being disposed in the optical path of the beams reflected by the half prism 32. Although the wedge prism 39 and the half prism 32 are in contact with each other in this embodiment, they may be separated from each other by a distance.

After passing through the wedge prism 39, the recording beam 2 is divided into two beam portions 40a and 40b, being refracted by the refraction surfaces 39a and 39b, respectively. Similarly, the reproducing beam 3 is divided into beams 41a and 41b refracted by the refraction surfaces 39a and 39b, respectively. A four-partitioned photosensor 42 has four sensor surfaces 42a, 42b, 42c, and 42d. The sensor surfaces 42a and 42b receive the beams 40a and 40b, respectively, while the sensor surfaces 42c and 42d receive the beams 41a and 41b, respectively. The four-partitioned photosensor 42 is divided into a first portion (consisting of the sensor surfaces 42b and 42c) and a second portion (consisting of the sensor surfaces 42b and 42d) by a first partition line parallel to the ridge 39c, and is further divided into four sensor surfaces 42a, 42b, 42c, and 42d by a second partition line perpendicular to the first partition line.

An adder 60 has a pair of inputs coupled to the outputs of sensor surfaces 42a and 42b, and outputs a monitor signal E of the recording beam 2. A differential amplifier 43, having an inverting input coupled to the sensor surface 42a and a non-inverting input coupled to the sensor surface 42b, detects a tracking error signal TS1 for the recording beam 2. Another differential amplifier 44, having an inverting input coupled to the sensor surface 42c and a non-inverting input coupled to the sensor surface 42d, detects a tracking error signal TS2 for the reproducing beam 3. Further, an adder 45 adds the outputs of the two sensor surfaces 42c and 42d to generate a reproduction output C. The reproduction signal detector circuit 23 forms a reproduction signal D from the reproduction output C output from the adder 45.

A knife plate 61 has a pair of knife-edges 61a and 61b parallel to each other, which run substantially in the radial direction (the direction perpendicular to the tracks) of the information storage medium 9. The knife-edges 61a and 61b screen about a half cross-sectional portion of the beams 2 and 3 transmitted through the half prism 32. The recording beam 2 which is screened by the knife 61 at the knife-edge 61a and which thus comes to have a semi-circular cross section is represented by reference numeral 62. Similarly, the reproducing beam 3 which is screened by the knife 61 at the knife-edge 61b and which thus comes to have a semi-circular cross section is represented by the reference numeral 63. A four-partitioned photosensor 64, having four parallel rectangular sensor surfaces 64a through 64d, is disposed at the converging points of the recording beam 62 and the reproducing beam 63 to receive these beams 62 and 63. The recording beam 62 is received on the partition line between the sensor surfaces 64a and 64b, while the reproducing beam 63 is received on the partition line between the sensor surfaces 64c and 64d. The partition line dividing the sensor surfaces 64a and 64b is parallel to and substantially aligned with the knife-edge 61a, while the partition line dividing the sensor surfaces 64c and 64d is parallel to and substantially aligned with the knife-edge 61b.

A differential amplifier 36, having an inverting input coupled to the sensor surface 64a of the photosensor 64 and a non-inverting input coupled to the sensor surface 64b of the photosensor 64, detects the focusing error signal FS1 of the recording beam 2. Another differential amplifier 27, having a non-inverting input coupled to the sensor surface 64c and an inverting input coupled to the sensor surface 64d of the photosensor 64, detects the focusing error signal FS2 of the reproducing beam 3.

A change-over switch 37 selects one of the outputs FS1 and FS2 of the differential amplifiers 36 and 27. On the other hand, the change-over switch 46 selects one of the outputs TS1 and TS2 of the differential amplifiers 43 and 44. An error signal change-over circuit 90 controls the switching operations of the switches 37 and 46. In response to the outputs of the error signal change-over circuit 90, the switch 37 selects the desired focusing error signal FS from the signal FS1 for the recording beam 2 and the signal FS2 for the reproducing beam 3, and the switch 46 selects the desired tracking error signal TS from the signal TS1 for the recording beam 2 and the signal TS2 for the reproducing beam 3.

By the way, the wedge prism 39, the sensor surfaces 42a and 42b of the four-partitioned photosensor 42, and the differential amplifier 43 constitute a tracking error detection system known as the push-pull method system for the recording beam 2. Likewise, the wedge prism 39, the sensor surfaces 42c and 42d, and the differential amplifier 44 constitute a tracking error detection system known as the push-pull method system for the reproducing beam 3. On the other hand, the knife-edge 61a of the knife 61, the sensor surfaces 64a and 64b of the photosensor 64, and the differential amplifier 36 constitute a focusing error detection system known as the knife-edge method system for the recording beam 2. Likewise, the knife-edge 61b of the knife 61, the sensor surfaces 64c and 64d, and the differential amplifier 37 constitute a tracking error detection system known as the knife-edge method system for the reproducing beam 3.

The recording and reproduction of information on the information storage medium 9 are effected by means of the recording beam 2 and reproducing beam 3 emitted from the two-beam semiconductor laser 1. These are effected in a manner similar to the case of the conventional device described above. In what follows, the methods of detecting the focusing and tracing errors, by which the error signals for the recording beam 2 and the reproducing beam 3 are separately detected, are described.

In FIG. 10, the recording beam 2 and the reproducing beam 3 reflected by the polarization beam splitter 5 are converged by the convex lens 31 and then are partially reflected by and partially transmitted through the half prism 32. The beams reflected by the half prism 32 are further divided via the wedge prism 39 into the recording beams 40a and 40b and the reproducing beams 41a and 41b, which are received by the photosensor 42. The beams transmitted through the half prism 32 are screened via the knife 61 and the resulting beams 62 and 63 are received by the photosensor 64. The four-partitioned photosensor 42 is disposed at the converging points of the recording beams 40a and 40b and the reproducing beams 41a and 41b, such that the four beams form four incident light spots which are spatially separated from each other. Thus, the adder 60, adding the outputs of the sensor surfaces 42a and 42b on which the recording beams 40a and 40b are incident, outputs a monitor signal E for the recording beam 2.

On the other hand, the tracking error detection for the recording beam 2 is effected as follows. Since the ridge 39c between the two refraction surfaces 39a and 39c of the wedge prism 39 is optically substantially aligned with the guide grooves 10 of the information storage medium 9, the part of the first order diffraction light diffracted at one edge of the track between the guide grooves 10 is contained in the beam 40a, while the part of the diffraction light diffracted at the other edge of the track is contained in the beam 40b. The beams 40a and 40b are received separately by sensor surface pairs 42a and 42b. Thus, the differential amplifier 43 having inputs coupled to the sensor surfaces 42a and 42b outputs the tracking error signal TS1 for the recording beam 2, in accordance with the principle of the push-pull method.

The tracking error detection for the reproducing beam 3 is effected similarly. The part of the first order diffraction light diffracted at one edge of the track between the guide grooves 10 is contained in the beam 41a, while the part of the diffraction light diffracted at the other edge of the track is contained in the beam 41b. The beams 41a and 41b are received separately by sensor surface pairs 42c and 42d. Thus, the differential amplifier 44 having inputs coupled to the sensor surfaces 42c and 42d outputs the tracking error signal TS2 for the reproducing beam 3, in accordance with the principle of the push-pull method.

Next, the focusing error detection for the recording beam 2 and reproducing beam 3 is described by reference to FIG. 11, which schematically shows the optical system of FIG. 10 as views from the top. In FIG. 11, the front views of the sensor surfaces of the photosensor 64 are also shown for easier comprehension of the optical images or light spots formed thereon. FIG. 11 shows only those portions which are essential for the focusing error detection.

FIG. 11(a) shows the state in which the information storage medium 9 is at the focal point $F_8$ of the objective 8. The recording beam 62, having a semi-circular cross section caused by the knife-edge 61a of the knife 61, is converged on the partition line between the sensor surfaces 64a and 64b of the photosensor 64. The reproducing beam 63, having a semi-circular cross section caused by the knife-edge 61b of the knife 61, is converged on the partition line between the sensor surfaces 64c and 64d of the photosensor 64. Thus, the output FS1 of the differential amplifier 36 for the recording beam 2 and the output FS2 of the differential amplifier 27 for the reproducing beam 3 are equal to zero.

FIG. 11(b) shows the state where the information storage medium 9 is farther away from the objective lens 8 than the focal point $F_8$ thereof. The recording beam 62, having a semi-circular cross section caused by the knife-edge 61a of the knife 61, is incident on the sensor surface 64b of the photosensor 64. The reproducing beam 63, having a semi-circular cross section caused by the knife-edge 61b of the knife 61, is incident on the sensor surface 64c of the photosensor 64. Thus, the output FS1 of the differential amplifier 36 for the recording beam 2 and the output FS2 of the differential amplifier 27 for the reproducing beam 3 are both positive (greater than zero).

On the other hand, FIG. 11(c) shows the state where the information storage medium 9 is nearer to the objective lens 8 than the focal point $F_8$ thereof. The recording beam 62, having a semi-circular cross section caused by the knife-edge 61a of the knife 61, is incident on the sensor surface 64a of the photosensor 64. The reproducing beam 63, having a semi-circular cross section caused by the knife-edge 61b of the knife 61, is incident on the sensor surface 64d of the photosensor 64. Thus, the output FS1 of the differential amplifier 36 for the recording beam 2 and the output FS2 of the differential amplifier 27 for the reproducing beam 3 are both negative (less than zero).

Thus, by means of one knife 41 alone, the direction and magnitude of the focusing error of the recording beam 2 and the reproducing beam 3 can be determined from the polarity (i.e., the sign) and the magnitude of the output signal FS1 of the differential amplifier 36 and the output signal FS2 of the differential amplifier 27.

When recording of information is effected on the information storage medium 9, the change-over switch 46 for the tracking error signal TS is switched by the error signal change-over circuit 90 to select the output signal TS1 of the differential amplifier 43 for the recording beam 2, the change-over switch 37 for the focusing error signal FS being changed over to select the output FS1 of the differential amplifier 36 for the recording beam 2. Thus, the recording of information is effected stably and reliably in accordance with the recording signal A generated by the recording signal generation circuit 24. The information thus recorded can be reproduced by the reproducing beam 3, as described in the introductory part of this specification in connection with the conventional optical recording-reproducing device, such that a reproduction output C corresponding to the pit forms B as shown in FIG. 4 can be detected by the adder 45. The output C of the adder 45 undergoes a waveform shaping via the reproduction signal detection circuit 23, and the resulting pulse-shaped reproduction signal D obtained by the circuit 23 is compared with the recording signal A in order to detect the defects of the recorded information.

On the other hand, when reproduction of information is effected on the information storage medium 9, the change-over switch 46 for the tracking error signal TS is changed over by the error signal change-over circuit 90 to select the output TS2 of the differential amplifier 44 for the reproducing beam 3, the change-over switch 37 for the focusing error signal FS being changed over to select the output FS2 of the differential amplifier 27 for the reproducing beam 3. Thus, the reproduction of information on the information storage medium 9 can be effected stably and reliably via the reproducing beam 3.

As described above, according to the embodiment of FIGS. 10 and 11, the focusing errors for the recording beam 2 and the reproducing beam 3 can be detected independently by means of a relatively simple optical system comprising the knife 61 and the four-partitioned photosensor 64, such that the recording and reproduction of information can be effected stably and reliably.

Figure 12:
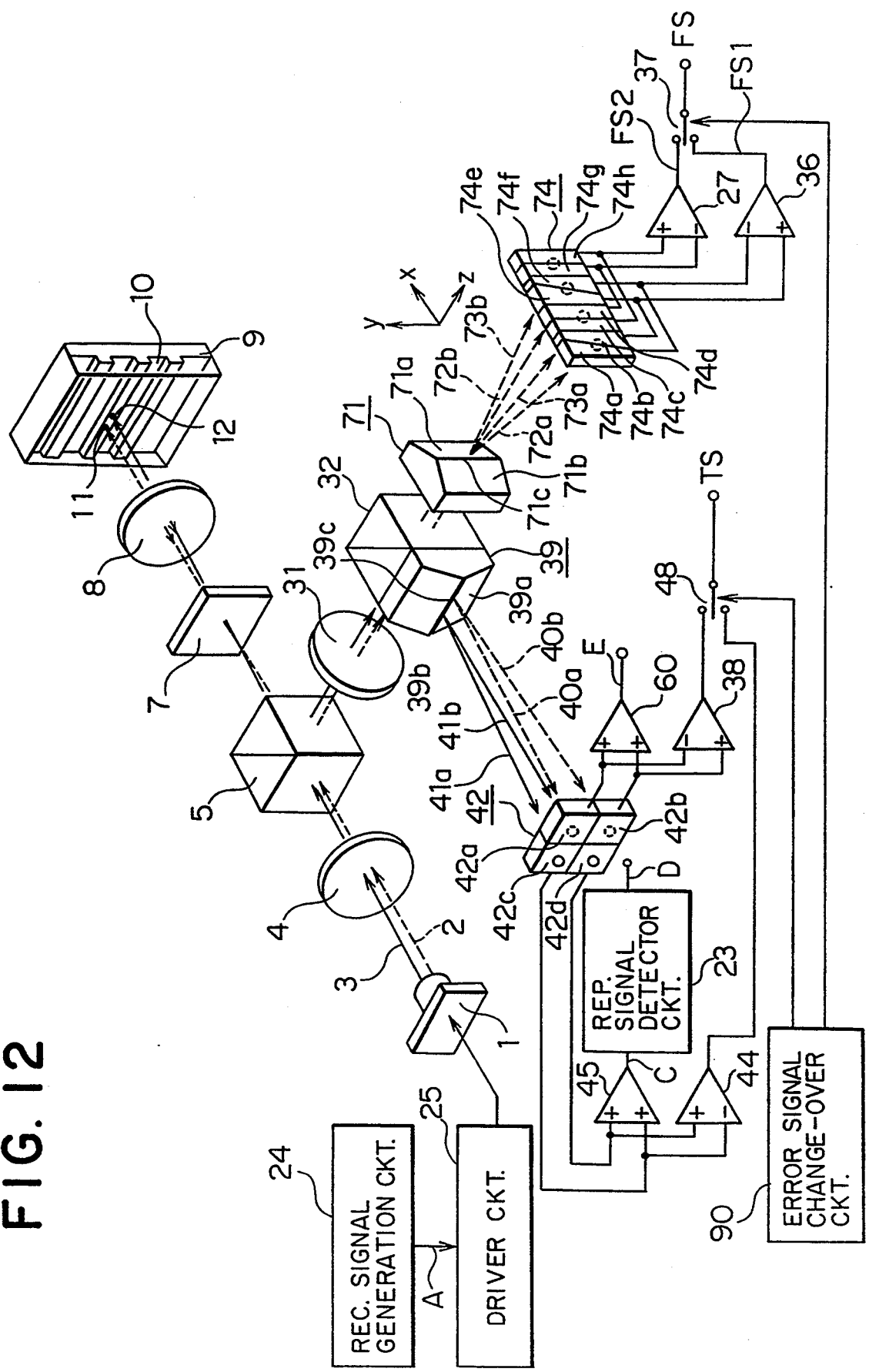
FIG. 12 is also a view similar to that of FIG. 1, but showing a further embodiment of this invention.

FIG. 12 shows still another embodiment wherein a wedge prism 71 and a eight-partitioned photosensor 74 are utilized for independent focusing error detections for the recording beam 2 and the reproducing beam 3, instead of the knife 61 and the four-partitioned photosensor 64 of FIGS. 10 and 11. The wedge prism 71 having a pair of wedge-shaped refraction surfaces 71a and 71b meeting at a ridge 71c is disposed in the optical path of the beams transmitted through the half prism 32, such that the ridge 71c, situated optically in front of the refraction surfaces 71a and 71b, is perpendicular to the optical path of the beams converged by the convex lens 31 and is substantially aligned with the radial direction of the information storage medium 9 (i.e., substantially perpendicular to the tracks on the information storage medium 9). The recording beams 72a and 72b, refracted by the refraction surfaces 71a and 71b of the wedge prism 71, and the reproducing beams 73a and 73b, refracted by the refraction surfaces 71a and 71b, are received by the eight-partitioned photosensor 74. The photosensor 74 having eight sensor surfaces 74a through 74h is disposed at the converging position of the beams 72a, 72b, 73a, and 73b. The partition line between the sensor surfaces 74c and 74d and the partition line between the sensor surfaces 74g and 74h are parallel to the ridge 71c of the wedge prism 71. The partition lines between the sensor surfaces 74a and 74b and between the sensor surfaces 74e and 74f are inclined toward the same direction and by the same degree with respect to the direction of the ridge 71c of the wedge prism 71. The recording beam 72a is received on the sensor surfaces 74a and 74b, being centered on the partition line therebetween. Likewise, the recording beam 72b is received on the sensor surfaces 74e and 74f, being centered on the partition line therebetween. The reproducing beam 73a is received on the sensor surfaces 74c and 74d, being centered on the partition line therebetween. Likewise, the reproducing beam 73b is received on the sensor surfaces 74g and 74h, being centered on the partition line therebetween.

A differential amplifier 36, having an inverting input coupled to the outputs of the sensor surfaces 74a and 74f and a non-inverting input coupled to the outputs of the sensor surfaces 74b and 74e, detects the focusing error signal FS1 for the recording beam 2. Another differential amplifier 27, having a non-inverting input coupled to the outputs of the sensor surfaces 74c and 74h and an inverting input coupled to the outputs of the sensor surfaces 74d and 74g, detects the focusing error signal FS2 for the reproducing beam 3. A change-over switch 37 changes over between and selects one from the outputs FS1 and FS2 of the differential amplifiers 36 and 27.

The wedge prism 71, the sensor surfaces 74a, 74b, 74e, and 74f of the eight-partitioned photosensor 74, and the differential amplifier 36 consititute an optical focusing error detection system known as the Foucault method detection system for the recording beam 2. Likewise, the wedge prism 71, the sensor surfaces 74c, 74d, 74g, and 74h of the eight-partitioned photosensor 74, and the differential amplifier 27 consititute an optical focusing error detection system known as the Foucault method detection system for the reproducing beam 3.

The focusing error detection is effected by the optical recording-reproducing device of FIG. 12 as follows.

Figure 13:
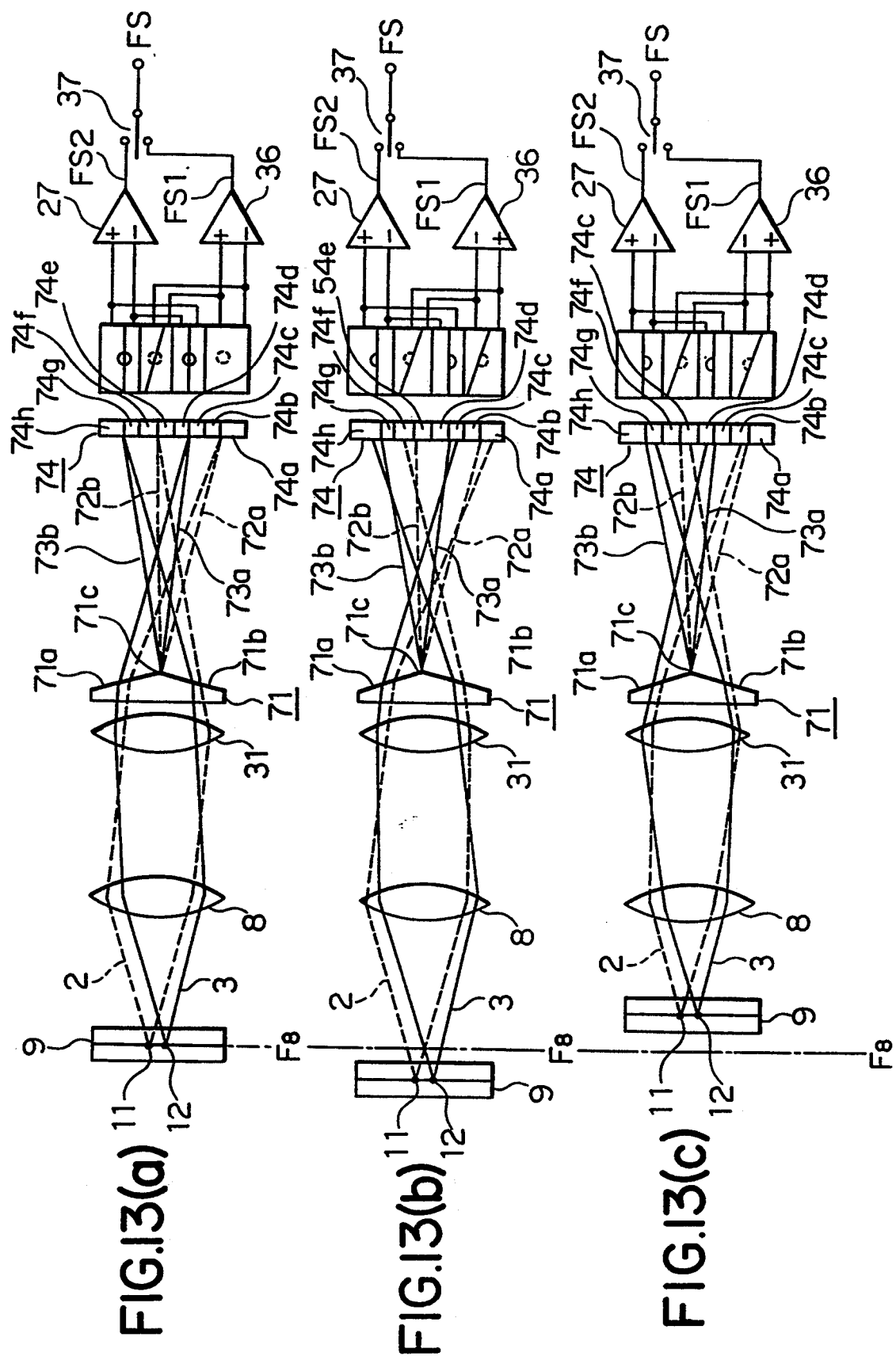
FIGS. 13(a)–13(c) are a schematic view of the optical system of FIG. 12, showing the principle of independent focusing error detection thereof.

FIG. 13 shows schematically the optical system of FIG. 12 as viewed from the top. The front views of the photosensor 74 are also shown for easier comprehension of the optical images (light spots) formed thereon. FIG. 13 shows only those portions which are essential for the understanding of the method of focusing error detection.

FIG. 13(a) shows the state where the information storage medium 9 is at the focal point $F_8$ of the objective 8. The recording beams 72a and 72b, refracted by the refraction surfaces 71a and 71b of the wedge prism 71, respectively, are converged on the partition line between the sensor surfaces 74a and 74b and the partition line between the sensor surfaces 74e and 74f, respectively. Similarly, the reproducing beams 73a and 73b, refracted by the refraction surfaces 71a and 71b of the wedge prism 71, are converged on the partition line between the sensor surfaces 74c and 74d and the partition line between the sensor surfaces 74g and 74h, respectively. Thus, the output FS1 of the differential amplifier 36 for the recording beam 2 and the output FS2 of the differential amplifier 27 for the reproducing beam 3 are both equal to zero.

FIG. 13(b) shows the state where the information storage medium 9 is farther away from the objective lens 8 than the focal point $F_8$ thereof. The recording beams 72a and 72b are incident on the sensor surfaces 74a and 74f of the photosensor 74, respectively. The reproducing beams 73a and 73b are incident on the sensor surfaces 74c and 74h, respectively. Thus, the output FS1 of the differential amplifier 36 for the recording beam 2 and the output FS2 of the differential amplifier 27 for the reproducing beam 3 are both positive (greater than zero).

On the other hand, FIG. 13(c) shows the state where the information storage medium 9 is nearer to the objective lens 8 than the focal point $F_8$ thereof. The recording beams 72a and 72b are incident on the sensor surfaces 74b and 74e of the photosensor 74, respectively. The reproducing beams 73a and 73b are incident on the sensor surfaces 74d and 74g, respectively. Thus, the output FS1 of the differential amplifier 36 for the recording beam 2 and the output FS2 of the differential amplifier 27 for the reproducing beam 3 are both negative (smaller than zero).

Next, the positioning method of the wedge prism 71 and the eight-partitioned photosensor 74 will be described with reference to the coordinate axes x, y, and z in FIG. 12. First, in the state where the information storage medium 9 is at the focal point $F_8$ of the objective lens 8 with respect to the reproducing beam 3, the wedge prism 71 is moved and adjusted in the direction of the z-axis (i.e., the direction of the optical path which optically substantially agrees with the direction of the thickness of the information storage medium 9). Further, in the state where the information storage medium 9 is at the focal point $F_8$ of the objective lens 8 with respect to the recording beam 2, the eight-partitioned photosensor 74 is moved and adjusted in the direction of the y-axis (the direction perpendicular to the direction z and parallel to the ridge 71c of the wedge prism 71) such that the recording beams 72a and 72b are converged on the partition line between the sensor surfaces 74a and 74b and the partition line between the sensor surfaces 74e and 74f, respectively.

Apart from the above description, the organization and the method of operation of the device of FIGS. 12 and 13 is similar to that of the device of FIGS. 10 and 11.

Figure 1:
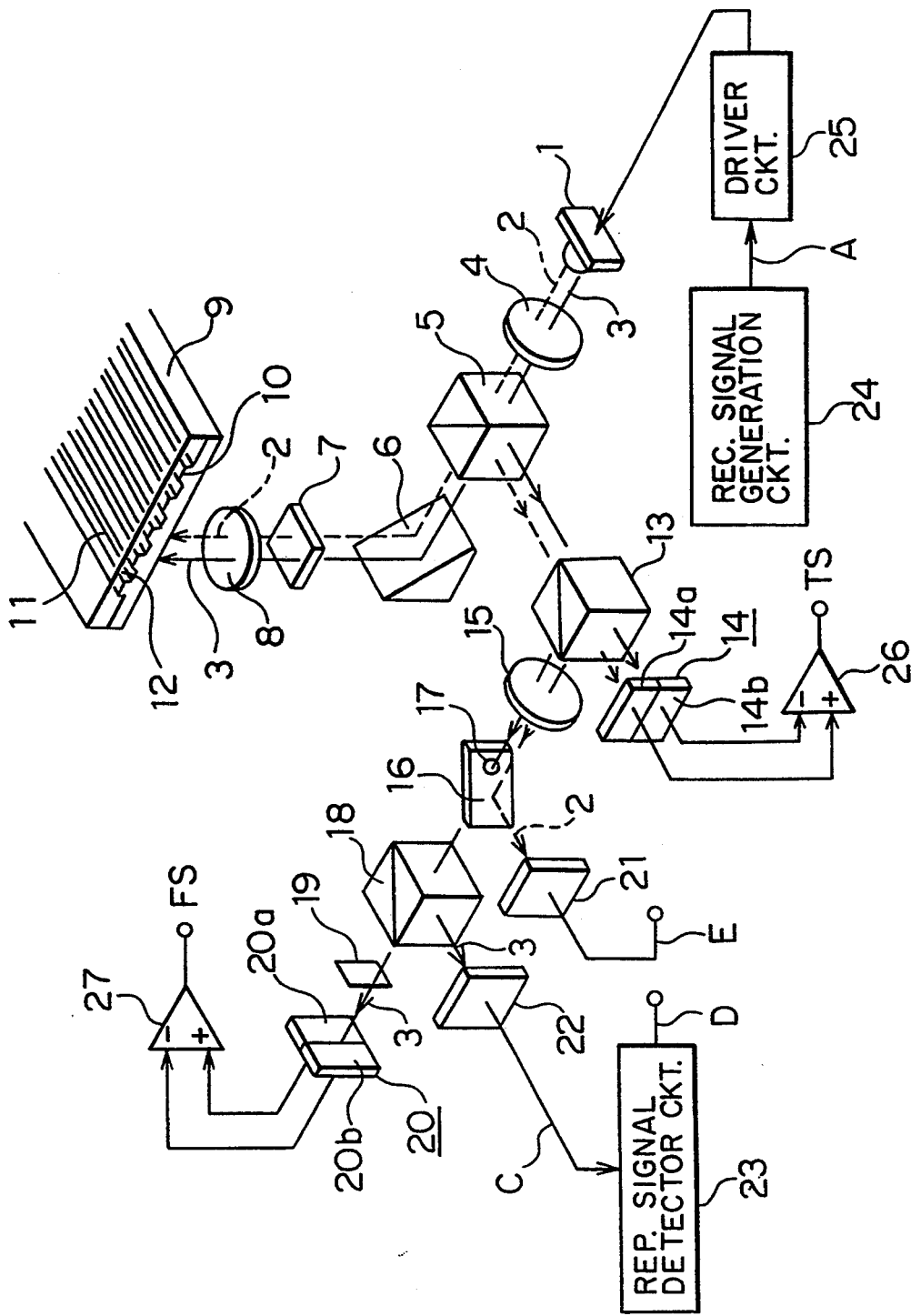
FIG. 1 is a schematic perspective view of the optical system of a conventional optical recording-reproducing device.
Figure 2:
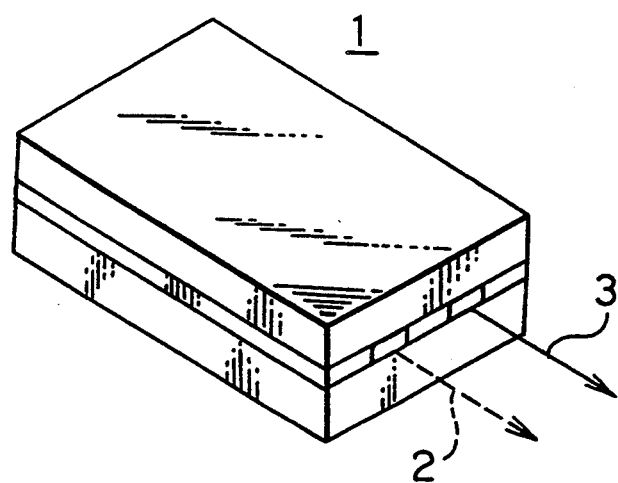
FIG. 2 is a perspective view of the two-beam semiconductor laser of the optical recording-reproducing device of FIG. 1.
Figure 3:
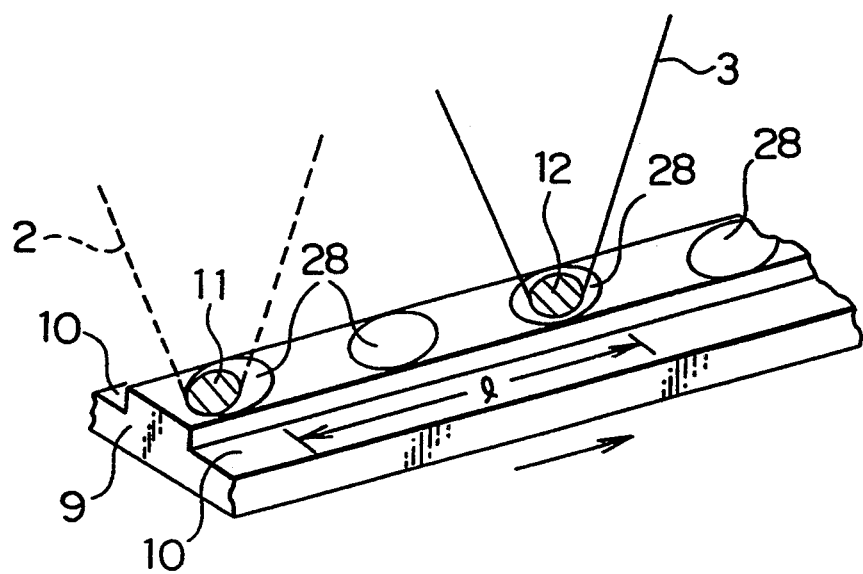
FIG. 3 is a view of a track on the information storage medium showing recording and reproduction light spots formed thereon.
Figure 14:
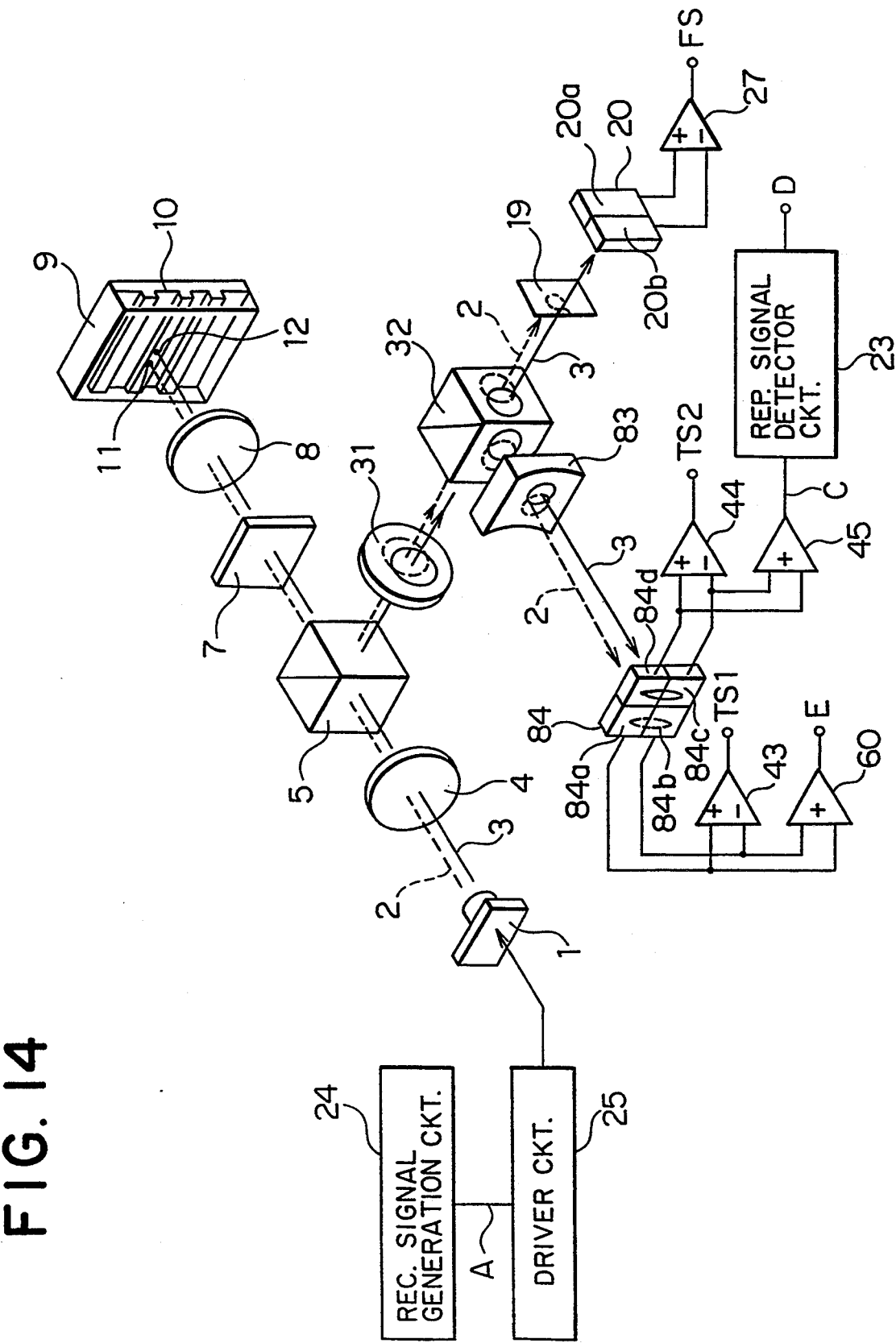
FIG. 14 is also a view similar to that of FIG. 1, but showing a further embodiment of this invention.

Referring next to FIG. 14, still another embodiment is described. In FIG. 14, reference numerals 1 through 5, 7 through 12, 19 and 20, 23 through 25, and 27 represent parts similar to those of the optical recording-reproducing device of FIG. 1 or FIG. 7.

Instead of the wedge prism 39 of FIG. 7, a cylindrical lens 83 is disposed in the optical path of the beams reflected by the half prism 32. In the case of this embodiment, a concave cylindrical lens 83 is positioned such that the direction of the lens action thereof (i.e., the direction along which the lens is curved) is optically perpendicular to the direction of the guide grooves 10 on the information storage medium 9. A four-partitioned photosensor 84, having four sensor surfaces 84a through 84d, is disposed such that the recording beam 2 from the cylindrical lens 83 is incident on the sensor surfaces 84a and 84b and the reproducing beam 3 is incident on the sensor surfaces 84c and 84d. The photosensor 84 is disposed in the optical paths of the beams 2 and 3 at the converging positions of the beams 2 and 3.

A differential amplifier 43 outputs the difference between the outputs of the two sensor surfaces 84a and 84b. Another differential amplifier 44 outputs the difference between the outputs of the two sensor surfaces 84c and 84d. An adder 60 adds the outputs of the two sensor surfaces 84a and 84b to obtain a monitoring signal E for the recording beam 2. Another adder 45 adds the outputs of the sensor surfaces 84c and 84d to obtain a reproduction output C, from which the reproduction signal D is obtained via the reproduction signal detecting circuit 23. Apart from the parts described above, the device of FIG. 14 is similar to that of FIG. 1 or FIG. 7.

The device of FIG. 14 is for effecting the real time monitoring function. The method of operation of the device of FIG. 14 is as follows. As shown in FIG. 14, the photosensor 84 is disposed in the optical path of the recording beam 2 and reproducing beam 3 at the converging points thereof. Thus, due to the action of the convex lens 31 and the concave cylindrical lens 83, the beams 2 and 3 form elongated elliptical incident light spots on the photosensor 84 which are separated from each other. Thus, the recording beam 2 and the reproducing beam 3 are detected independently by the sensor surface pair 84a and 84b and the sensor surface pair 84c and 84d, respectively. The adder 60 outputs a monitoring signal E for the recording beam 2, while the adder 45 outputs a reproduction output C. The direction perpendicular to the guide grooves 10 on the information storage medium 9 is optically aligned with the direction of the far field pattern of the beams 2 and 3 on the photosensor 84. Thus, the tracking errors of the recording beam 2 and the reproducing beam 3 can be detected from the outputs of the photosensor 84 in accordance with the push-pull method. The tracking error signal TS1 for the recording beam 2 is obtained as the output of the differential amplifier 43 having inputs coupled to the sensor surfaces 84a and 84b. The tracking error signal TS2 for the reproducing beam 3 is obtained as the output of the differential amplifier 44 having inputs coupled to the sensor surfaces 84c and 84d. The method of operation of the device of FIG. 14 is otherwise similar to that of FIG. 1 or FIG. 7.

The above embodiment shows the case where a concave cylindrical lens 83 is used. However, a convex cylindrical lens may be used instead. Indeed, any optical system may be used provided that the surface of the photosensor 84 lies at the converging points of the beams 2 and 3 in the optical paths thereof, and the sensor surface pair of the photosensor 84 for the recording beam 2 (the sensor surfaces 84a and 84b in FIG. 14) and that for the reproducing beam 3 (the sensor surfaces 84c and 84d in FIG. 14), respectively, are aligned with the direction of the far field pattern of the beams 2 and 3.

Furthermore, it goes without saying that the principle of this embodiment is applicable to the optical recording-reproducing devices for effecting the overwriting or parallel recording/reproduction functions. However, the following points must be noted in connection with the parallel recording and reproduction.

FIG. 15 shows the relationship between the recording and reproducing beams and the four-partitioned photosensor in the case of the optical recording-reproducing device for effecting the parallel recording/reproduction, wherein FIG. 15(a) is a partial plan view of the information storage medium 9 and FIG. 15(b) shows the optical paths of the beams. In FIG. 15(b), only those parts which are essential to the understanding of the method of operation are represented. In FIG. 15(a) and (b), a first and a second light spot 91 and 92 are formed via a first and a second beam 93 and 94 on recording tracks on the information storage medium 9 separated from each other by a radial distance or track pitch $\delta$. FIG. 15(c) shows the front view of the photosensor 84 together with the differential amplifiers 43 and 44 and adders 60 and 45. The differential amplifier 43 having inputs coupled to sensor surfaces 84a and 84b outputs a tracking error signal TS1 for the first beam 93, while the adder 60 outputs a reproduction signal RF1. Similarly, the differential amplifier 44 having inputs coupled to the sensor surfaces 84c and 84d outputs a tracking error signal TS2 for the second beam 94, while the adder 45 outputs a reproduction signal RF2 for the second beam 94. In the case of parallel recording/reproduction, the light spots 91 and 92 of the two beams 93 and 94 are formed on tracks separated from each other by a radial distance $\delta$. Thus, as shown in FIG. 15(b) and (c), the centers of the two beams 93 and 94 are shifted from each other on the photosensor 84 by a distance $\delta_0$ along a direction optically perpendicular to the direction of the tracks or guide grooves 10 on the information storage medium 9. The magnitude of this shift $\delta_0$, which depends on the focal distance f of the objective lens 8 and the optical distance L between the objective lens 8 and the photosensor 84, is given by:

$$\delta_0 = (L/f) \cdot \delta$$

Figure 15D:
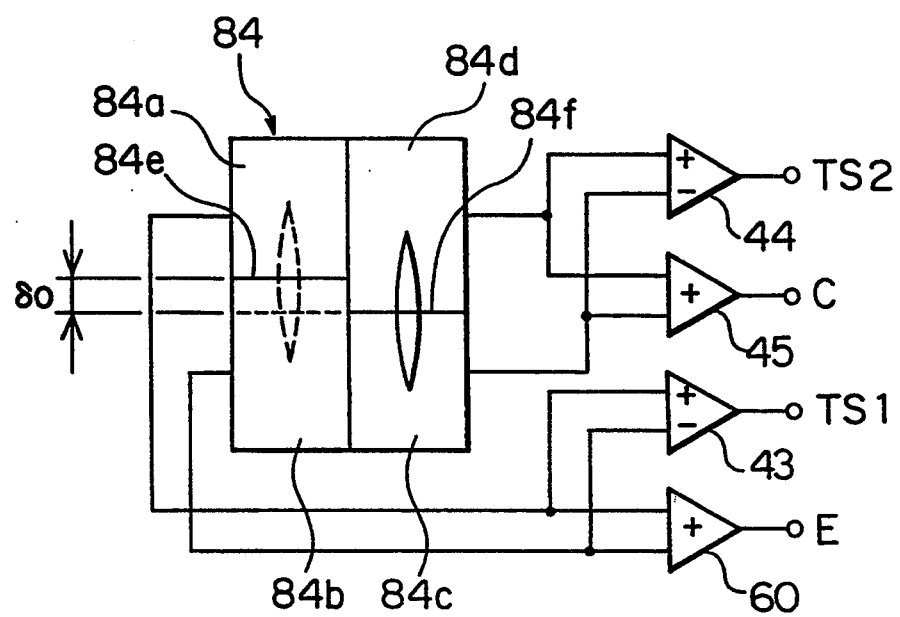

For example, under the circumstance where the track pitch $\delta$ is 1.6 micrometers, the focal distance f of the objective lens 8 is 4 mm, and the distance L between the objective lens 8 and the photosensor 94 is 40 mm, the shift $\delta_0$ of the beams on the photosensor surface is equal to 16 micrometers. If the major axes of the elliptical light spots formed by the beams 93 and 94 on the photosensor 84 are long enough compared with the shift $\delta_0$ therebetween, the offset of the tracking error signals TS1 and TS2 due to the shift $\delta_0$ is negligible. In the case where the offset due to the shift $\delta_0$ of the beams is not negligible, the partition line between the sensor surfaces 84a and 84b may be shifted by the distance $\delta_0$ with respect to the partition line between the sensor surfaces 84c and 84d, as shown in FIG. 15(d). The geometry of the sensor surfaces of the photosensor 84 of FIG. 15(d) eliminates the offset between the two tracking error signals TS1 and TS2.

What is claimed is:

1. An optical recording-reproducing device for recording information on, and reproducing information from, tracks formed on an information storage medium, comprising:

beam generator means for simultaneously generating independently-driven first and second light beams;

an optical system for simultaneously converging the first and second light beams on a track on the information storage medium;

tracking error detector means for detecting independently respective tracking errors of the first and second light beams on a track on the information storage medium, the tracking error detector means generating independent tracking error signals corresponding to the respective tracking errors of the first and the second beams;

tracking error change-over switching means for selecting one of the tracking error signals generated by the tracking error detector means;

tracking error control means for controlling the optical system in response to the selected tracking error signal to minimize the tracking error indicated by the selected tracking error signal;

focusing error detector means for detecting independently respective focusing errors of the first and second light beams on a track on the information storage medium, the focusing error detector means generating independent focusing error signals corresponding to the respective focusing errors of the first and the second beams;

focusing error change-over switching means for selecting one from the focusing error signals generated by the focusing error detector means; and focusing error control means for controlling the optical system in response to the selected focusing error signal to minimize the focusing error indicated by the selected focusing error signal.

2. An optical recording-reproducing device as claimed in claim 1, wherein the beam generator comprises a two-beam laser having first and second active regions for generating the first and second light beams.

3. An optical recording-reproducing device as claimed in claim 1, wherein the beam generator means comprises first and second independent lasers for generating the first and second light beams.

4. An optical recording-reproducing device as claimed in claim 1, wherein the focusing error detector means detects the focusing errors in accordance with a knife-edge method.

5. An optical recording-reproducing device as claimed in claim 4, wherein the focusing error detector means comprises:

converging means for converging the first and second light beams reflected or diffracted by the information storage medium;

a half mirror prism for dividing into reflected and transmitted portions the first and second light beams converged by the converging means;

a first knife-edge member for partially shielding the first beam reflected by the half mirror prism, the first knife-edge member totally shielding the second beam reflected by the half prism;

a second knife-edge member for partially shielding the second beam transmitted by the half mirror prism, the second knife-edge member totally shielding the first beam;

a first two-partitioned photosensor having a pair of independent sensor surfaces receiving on a partition line therebetween the first beam converged by the converging means and partially shielded by the first knife-edge member; and a second two-partitioned photosensor having a pair of independent sensor surfaces receiving on a partition line therebetween the second beam converged by the converging means and partially shielded by the second knife-edge member.

6. An optical recording-reproducing device as claimed in claim 4, wherein the focusing error detector means comprises:

converging means for converging the first and second light beams reflected or diffracted by the information storage medium;

a knife-edge member having a pair of knife-edges for partially shielding the first and second beams, respectively, converged by the converging means; and a four-partitioned photosensor having a first and a second pair of independent sensor surfaces, the first pair of sensor surfaces receiving on a partition line therebetween the first beam converged by the converging means and partially shielded by the knife-edge member, and the second pair of sensor surfaces receiving on a partition line therebetween the second beam converged by the converging means and partially shielded by the knife-edge member.

7. An optical recording-reproducing device as claimed in claim 1, wherein the focusing error detector means detects the focusing errors in accordance with a Foucault method.

8. An optical recording-reproducing device as claimed in claim 7, wherein the focusing error detector means comprises:

converging means for converging the first and second light beams reflected or diffracted by the information storage medium;

a wedge-shaped prism having a first and a second refraction surfaces meeting at a ridge optically perpendicular to the tracks on the information storage medium, wherein the first and second beams converged by the converging means are each divided into two portions refracted by the first and the second refraction surfaces of the wedge-shaped prism, respectively; and an eight-partitioned photosensor having an array of first through eighth independent sensor surfaces divided by partition lines substantially parallel to the ridge of the wedge prism, the first and second sensor surfaces receiving on a partition line therebetween the first beam refracted by the first refraction surface, fifth and sixth sensor surfaces receiving on a partition line therebetween the first beam refracted by the second refraction surface, third and fourth sensor surfaces receiving on a partition line therebetween the second beam refracted by the first refraction surface, and seventh and eighth sensor surfaces receiving on a partition line therebetween the second beam refracted by the second refraction surface of the wedge prism.

9. An optical recording-reproducing device as claimed in claim 8, wherein the partition line between the first and second sensor surfaces and the partition line between the fifth and sixth sensor surfaces are inclined with respect to the direction of the ridge of the wedge-shaped prism.

10. An optical recording-reproducing device as claimed in claim 1, wherein the focusing error detector means detects the focusing errors in accordance with an astigmatic method.

11. An optical recording-reproducing device for recording information on, and reproducing information from, tracks formed on an information storage medium, comprising:
   beam generator means for simultaneously generating independently-driven first and second light beams;
   an optical system for simultaneously converging the first and second light beams on a track on the information storage medium;
   tracking error detector means for detecting independently respective tracking errors of the first and second light beams on a track on the information storage medium in accordance with a push-pull method, the tracking error detector means generating independent tracking error signals corresponding to the respective tracking errors of the first and the second beams;
   tracking error change-over switching means for selecting one of the tracking error signals generated by the tracking error detector means; and
   tracking error control means for controlling the optical system in response to the selected tracking error signal to minimize the tracking error indicated by the selected tracking error signal.

12. An optical recording-reproducing device as claimed in claim 11, wherein the tracking error detector means comprises:
   a wedge-shaped prism having a first and a second refraction surface meeting at a ridge optically aligned with the tracks on the information storage medium; and
   a four-partitioned photosensor having a first and a second pair of independent sensor surfaces, wherein two sensor surfaces of each one of the first and second pairs of sensor surfaces receive beams refracted by the first and second refraction surfaces, respectively.

13. An optical recording-reproducing device as claimed in claim 11, wherein the tracking error detector means comprises:
   an optical system for guiding the first and second light beams reflected or diffracted by the information storage medium, wherein the optical system converges the first and second beams along a direction optically parallel to the tracks on the information storage medium, and forms far field patterns for the first and second beams in a direction optically perpendicular to the tracks on the information storage medium; and
   a four-partitioned photosensor having a first and second pair of independent sensor surfaces disposed at converging positions of the first and second beams converged by the optical system, wherein the first pair of sensor surfaces are arranged along the direction of the far field pattern of the first beam so as to receive the first beam centered on a partition therebetween and the second pair of sensor surfaces are arranged along the direction of the far field pattern of the second beam so as to receive the second beam centered on a partition line therebetween.

14. An optical recording-reproducing device as claimed in claim 13, wherein the optical system comprises a concave cylindrical lens having a direction of lens action optically perpendicular to the direction of the tracks on the information storage medium.

15. An optical recording-reproducing device as claimed in claim 13, comprising a first differential amplifier having inputs coupled to the first pair of sensor surfaces, and a second differential amplifier having inputs coupled to the second pair of sensor surfaces.

16. An optical recording-reproducing device comprising:
   recording beam generating means for generating a recording light beam;
   reproducing beam generating means for generating a reproducing light beam, the recording light beam and the reproducing light beam being independently driven;
   an optical system for simultaneously directing the recording light beam and the reproducing light beam onto a track of an information storage medium;
   tracking error detector means for independently detecting a tracking error of the recording light beam and a tracking error of the reproducing light beam on a track of an information storage medium and generating a recording tracking error signal and a reproducing tracking error signal corresponding to the respective tracking errors of the recording and reproducing light beams;
   switching means for selecting the recording tracking error signal generated by the tracking error detector means when a recording operation is taking place and the reproducing tracking error signal generated by the tracking error detector means when a recording operation is not taking place; and
   tracking error control means for controlling the optical system in response to the selected tracking error signal to minimize the tracking error indicated by the selected tracking error signal.

17. An optical recording-reproducing device comprising:
   recording beam generating means for generating a recording light beam;
   reproducing beam generating means for generating a reproducing light beam, the recording light beam and the reproducing light beam being independently driven;
   an optical system for simultaneously directing the recording light beam and the reproducing light beam onto a track of an information storage medium;
   focusing error detector means for independently detecting a focusing error of the recording light beam and a focusing error of the reproducing light beam on a track of an information storage medium and generating a recording focusing error signal and a reproducing focusing error signal corresponding to the respective focusing errors of the recording and reproducing light beams;
   switching means for selecting the recording focusing error signal generated by the focusing error detector means when a recording operation is taking place and the reproducing focusing error signal generated by the focusing error detector means when a recording operation is not taking place; and
   focusing error control means for controlling the optical system in response to the selected focusing error signal to minimize the focusing error indicated by the selected focusing error signal.

* * * * *